US008838755B2

(12) United States Patent
Sanghvi et al.

(10) Patent No.: US 8,838,755 B2
(45) Date of Patent: Sep. 16, 2014

(54) UNIFIED SERVICE MANAGEMENT

(75) Inventors: Ashvinkumar J. Sanghvi, Sammamish, WA (US); Shawn Bice, Sammamish, WA (US); Casey McKinnon, Seattle, WA (US); Vij Rajarajan, Issaquah, WA (US); Jens K Jacobsen, Seattle, WA (US); Kristoffer S Schultz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 122 days.

(21) Appl. No.: 11/940,545

(22) Filed: Nov. 15, 2007

(65) Prior Publication Data
US 2009/0228579 A1  Sep. 10, 2009

Related U.S. Application Data

(60) Provisional application No. 60/896,534, filed on Mar. 23, 2007.

(51) Int. Cl.
*G06F 15/177* (2006.01)
*H04L 12/24* (2006.01)
*G06F 15/173* (2006.01)

(52) U.S. Cl.
CPC .......... *H04L 41/145* (2013.01); *H04L 41/0869* (2013.01); *H04L 41/0843* (2013.01)
USPC ............................ 709/221; 709/220; 709/223

(58) Field of Classification Search
USPC .................................................. 709/220, 223
See application file for complete search history.

(56) References Cited

U.S. PATENT DOCUMENTS

| 6,330,586 | B1 | 12/2001 | Yates et al. |
| 7,017,047 | B2 | 3/2006 | Vanska et al. |
| 7,111,053 | B1* | 9/2006 | Black et al. .................... 709/220 |
| 2004/0022366 | A1* | 2/2004 | Ferguson et al. ............ 379/1.01 |
| 2005/0114829 | A1* | 5/2005 | Robin et al. .................... 717/101 |
| 2005/0198247 | A1* | 9/2005 | Perry et al. .................... 709/223 |
| 2006/0059253 | A1* | 3/2006 | Goodman et al. ............. 709/223 |
| 2006/0064486 | A1* | 3/2006 | Baron et al. .................. 709/224 |

(Continued)

FOREIGN PATENT DOCUMENTS

| JP | 10513325 | 12/1998 |
| JP | 2005234705 | 9/2005 |
| JP | 2006518080 | 8/2006 |
| KR | 20010016689 | 3/2001 |

OTHER PUBLICATIONS

PCT search report dated Jul. 30, 2008, 10 pages.

(Continued)

*Primary Examiner* — David Lazaro
*Assistant Examiner* — Vitali Korobov
(74) *Attorney, Agent, or Firm* — Jim Sfekas; Kate Drakos; Micky Minhas

(57) ABSTRACT

The described unified service management system provides a unified console to perform functions of individual management specialists. A unified console facilitates an administrator to perform the complex tasks that were performed by the individual management specialists. The unified console provides a "wizard" based approach to the administrator to design all aspects of the complex tasks including placement of components or computing devices, deciding on policies of the components or computing devices, deciding on health policies of components or computing devices, fixing data protection policies of components or computing devices, etc.

20 Claims, 37 Drawing Sheets

(56) References Cited

U.S. PATENT DOCUMENTS

2006/0161444 A1\* 7/2006 Lubrecht et al. .................. 705/1
2006/0161879 A1\* 7/2006 Lubrecht et al. ............. 717/101
2006/0200816 A1 9/2006 Pramanick et al.

OTHER PUBLICATIONS

Translated the Chinese Office Action mailed Apr. 7, 2011 for Chinese Patent Application No. 200880009273.5, a counterpart foreign application of U.S. Appl. No. 11/940,545.

The Chinese Office Action mailed Feb. 29, 2012 for Chinese patent application No. 200880009273.5, a counterpart foreign application of U.S. Appl. No. 11/940,545, 9 pages.

Translated the Japanese Office Action mailed Jun. 15, 2012 for Japanese patent application No. 2010-501115, a counterpart foreign application of U.S. Appl. No. 11/940,545, 11 pages.

Translated the Japanese Office Action mailed Oct. 12, 2012 for Japanese patent application No. 2010-501115, a counterpart foreign application of U.S. Appl. No. 11/940,545, 6 pages.

The Chinese Office Action mailed Nov. 22, 2012 for Chinese Patent Application No. 200880009273.5, a counterpart foreign application of U.S. Appl. No. 11/940,545, 7 pages.

\* cited by examiner

UNIFIED SERVICE MANAGEMENT

RELATED APPLICATIONS

The present application claims priority under 35 U.S.C. §119(e) to U.S. Provisional Application No. 60/896,534 filed Mar. 23, 2007, the disclosure of which is incorporated herein.

BACKGROUND

Service management capabilities appropriate for an enterprise network or a distributed network may be divided into "silos" suitable for management by an associated management specialist. In a typical scenario, management disciplines of different management specialists may be isolated from each other. For example, when a user who has broad or deep knowledge of all management disciplines or a "Versatalist" (in contrast to a "Specialist" who has specific and deep knowledge or a "Generalist" who has broad, but shallow knowledge) tries to manage certain services, the "Versatalist" may not be aware of a specific management discipline that might require attention.

As management disciplines are disjointed, the an information technology or user is exposed to limited automation tools for completing complex tasks such as choosing managerial changes in an enterprise network or the distributed network. The managerial changes may include deploying software applications and hardware components in the enterprise network, and altering connections between various computing devices in the enterprise network. Furthermore, the management disciplines do not provide adequate validation methodologies. Therefore, an administrator may have to depend on "pilots" or simulation programs for testing the managerial changes. As a result, testing of the managerial changes prior to implementation of the managerial changes in an enterprise network may not be efficient.

SUMMARY

This summary is provided to introduce simplified concepts of unified service management, which is further described below in the Detailed Description. This summary is not intended to identify essential features of the claimed subject matter, nor is it intended for use in determining the scope of the claimed subject matter.

In an embodiment, changes to be implemented on the managed network are identified and an appropriate model and deployment profile associated with the model are selected. A change template based on the selected deployment is chosen and change order instances are created from the changed template. The change order may be validated and the changes implemented upon validation.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

Figure 16:
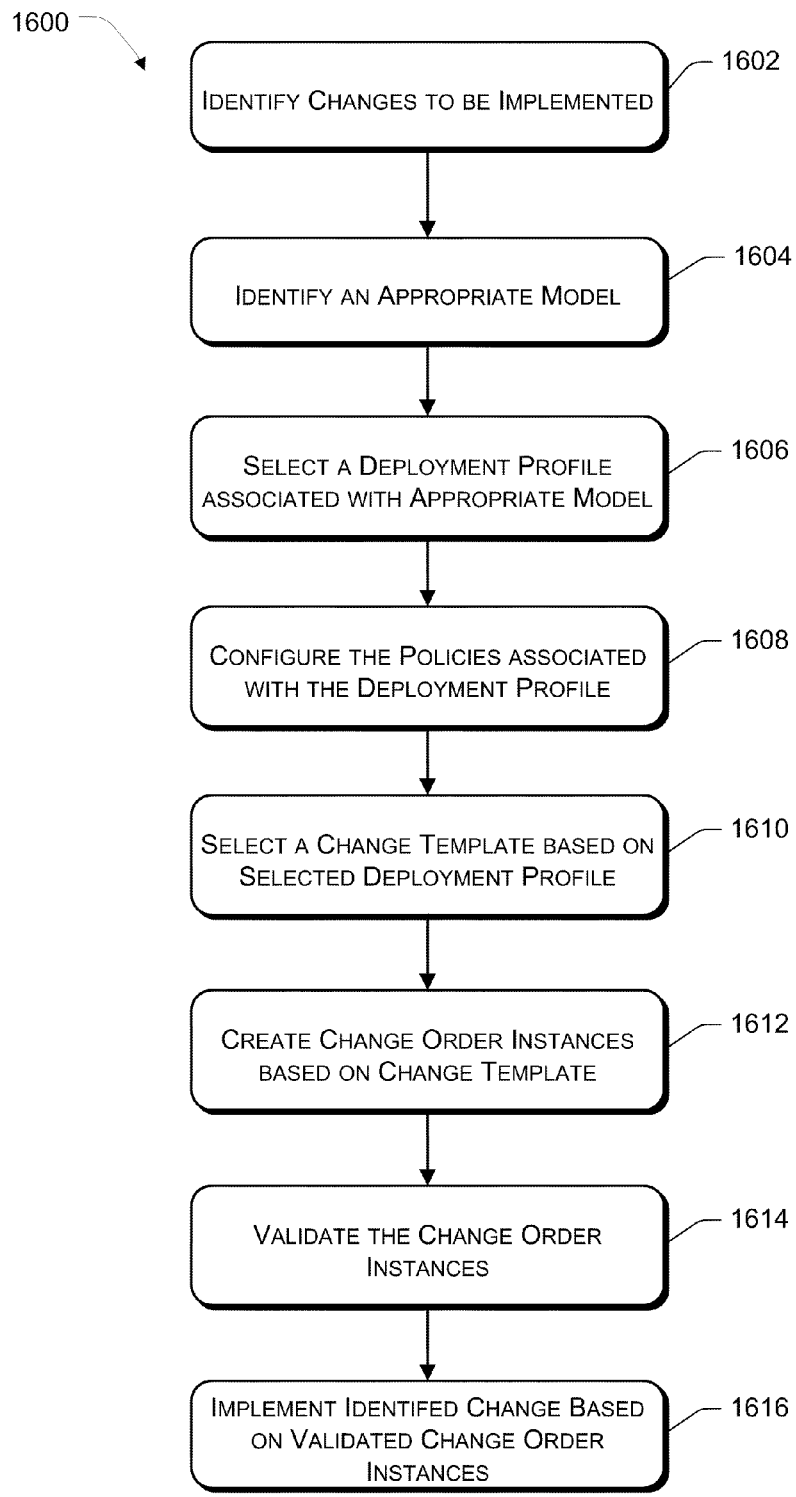

FIG. 16 an exemplary method for implementing managerial changes in the management system.

DETAILED DESCRIPTION

The following disclosure describes systems and methods for unified service management. While aspects of described systems and methods for unified service management can be implemented in any number of different computing systems, environments, and/or configurations, embodiments of unified service management of networks and analysis are described in the context of the following exemplary system architecture(s).

Traditionally, individual management specialists have managed networks using separate management servers such as Microsoft® Operations Manager (MOM) servers, System Management Servers (SMS), Virtual Manager Servers, etc. Such management servers usually offer complex user experiences and operate independent of each other. These management servers perform limited automated operations for completing complex tasks like implementing a change in a network, deploying network resources of different configurations, monitoring the network, etc. Such complex tasks may have to be preplanned by a user and then implemented on the management servers. For example, changes in a network may be decided upon by a group of technologists. An administrator can then implement the selected changes using respective management servers. The network may fail after implementation of the selected changes as the management servers may have inadequately validated the selected changes prior to deployment. Moreover, the selected changes may not be decided based on a formalized model of the network. Therefore, a future picture of the network with the selected changes perceived by technologists can be incorrect resulting in such network failures.

The described unified service management system provides a unified console to perform functions of individual management specialists. The unified console facilitates an administrator to perform the complex tasks that were performed by the individual management specialists. The unified console provides a "wizard" based approach to the administrator to design all aspects of the complex tasks including placement of components or computing devices, deciding on policies of the components or computing devices, deciding on health policies of components or computing devices, fixing data protection policies of components or computing devices, etc.

Exemplary Management System

Figure 1:
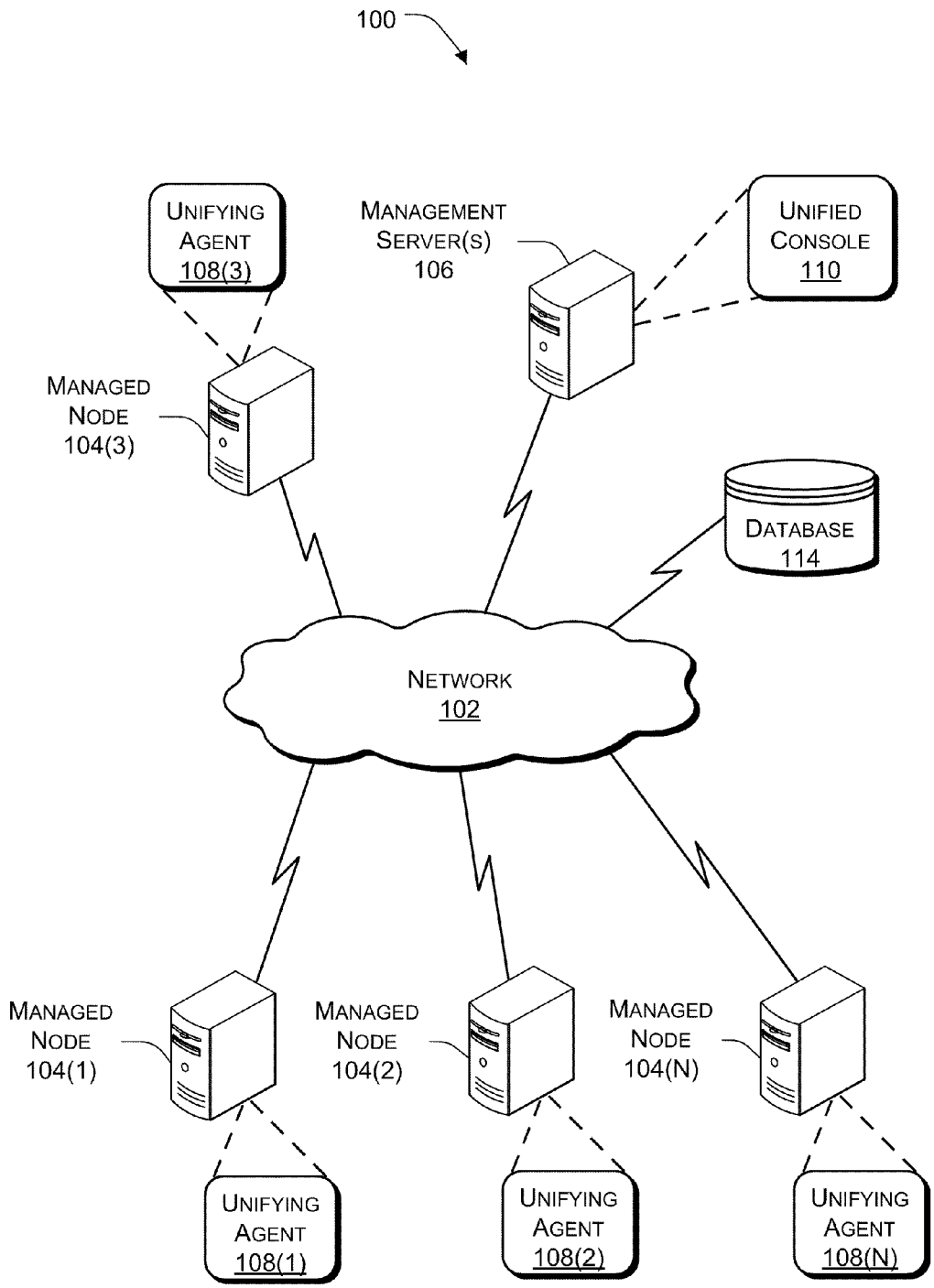
FIG. 1 is an illustration of an exemplary IT service management system.

FIG. 1 shows an exemplary IT service management system 100 for a distributed network. The system 100 includes a network 102 through which one or more managed nodes 104(1), 104(2), 104(3), . . . , 104(N) communicate with each other and with the management server(s) 106. The network 102 may include, for example, local area network (LAN), wide area network, wireless network, optical network, metropolitan area network (MAN), etc.

In an exemplary implementation, the network 102 may be an enterprise network including hardware, software, and media connecting information technology resources in an organization. A typical enterprise network is formed by connecting network clients, managed nodes, servers, management servers, and a number of other components like routers, switches, etc., through communication media. The managed nodes 104 may include one or more of the above-mentioned network elements. Each of the managed nodes 104 may run an application or a program. A particular managed node 104 may depend on other network elements in the enterprise network such as, servers, routers, switches, services, links, etc. to support the application running on the node 104.

The managed node 104 may include one or more of any known computing devices, such as PDAs, desktops, workstations, servers, laptops, etc. The management server(s) 106 may include one or more of a cluster of servers, workstations, and the like. The management server(s) 106 employ a unified methodology to plan and implement changes in the distributed network. The changes may include deploying various applications and hardware features at the managed node 104.

Each managed nodes 104 can respectively employ unifying agents 108(1), 108(2), 108(3) . . . 108(N), to implement the instructions of the management server(s) 106. The instructions may include automatically collecting status of the managed nodes 104 and of various other resources in the network 102, and implementing any configurational changes in the managed nodes 104 and/or the distributed network. The status of a particular managed node 104 may include, for example, performance of hardware components and software applications in the managed node 104, number of faults occurring in the managed node 104 and their frequency, deployment status of the changes, and health information of the managed node 104 and the applications installed.

The management server(s) 106 implement a unified console 110 through which the changes can be planned and implemented. The manner in which the management server 106 deploys the applications and hardware features is explained in the section titled "Exemplary Unified Console." In an exemplary embodiment, the management server 106 provides a plurality of modes of operation. The various modes of operation may include an operating mode, a changing mode, a supporting mode, and a planning mode. The various modes of operation may be presented to a user such as an IT administrator, via the unified console 110.

In operation, in the operating mode the management sever(s) 106 exposes the capability of the management server(s) 106 to monitor operations of the managed node 104. Such monitoring enables the management server(s) 106 to collect the status of the applications and the hardware components associated with the managed node 104. The management server(s) 106 collects and processes the status to display the status in a graphical format, or any other formats known to a user or an IT administrator. The manner in which the status is displayed is explained in detail under section "Exemplary User Interfaces." The user can review the status displayed and can take corrective actions accordingly.

In one implementation, the management server(s) 106 may be in a changing mode. In the changing mode, the unified console 110 of the management server(s) 106 facilitates the IT administrator to make changes in the configurations of the managed nodes 104. The management server(s) 106 can implement the changes including deciding on the placement of components, network policies, health policies, and data protection policies, etc. Once the changes are implemented, details of the implementation are automatically updated in a configuration management database associated with the management server(s) 106.

For example, a user may decide upon a set of selected changes to be implemented on a cluster of managed nodes 104 in the distributed network based on the status of the managed nodes 104 collected by the management server(s) 106. The selected changes may include, for example, installation of new software applications, addition of hardware features, changing health policies of the hardware features, and changing data protection policies of the new software applications. The user can implement the selected changes in the cluster irrespective of the number of managed nodes 104 present in the cluster.

The selected changes may be pre-stored by the IT administrator in a database 112. The management server(s) 106 can gather the selected changes from the database 112 and implement the selected changes. Once the selected changes are implemented in all the managed nodes 104 of the cluster, the management server(s) 106 shifts to the operating mode, while continually monitoring the distributed network.

The management server(s) 106 may operate in a supporting mode to support smooth operation of the distributed network. In another implementation, the management server(s) 106 operates in a planning mode that enables the user to schedule a time for implementing the changes. For example, the user may employ the management server(s) 106 operating in a planning mode to implement the changes at a later stage by scheduling a time at which the changes can be implemented.

Exemplary Unifying Agent

Figure 2:
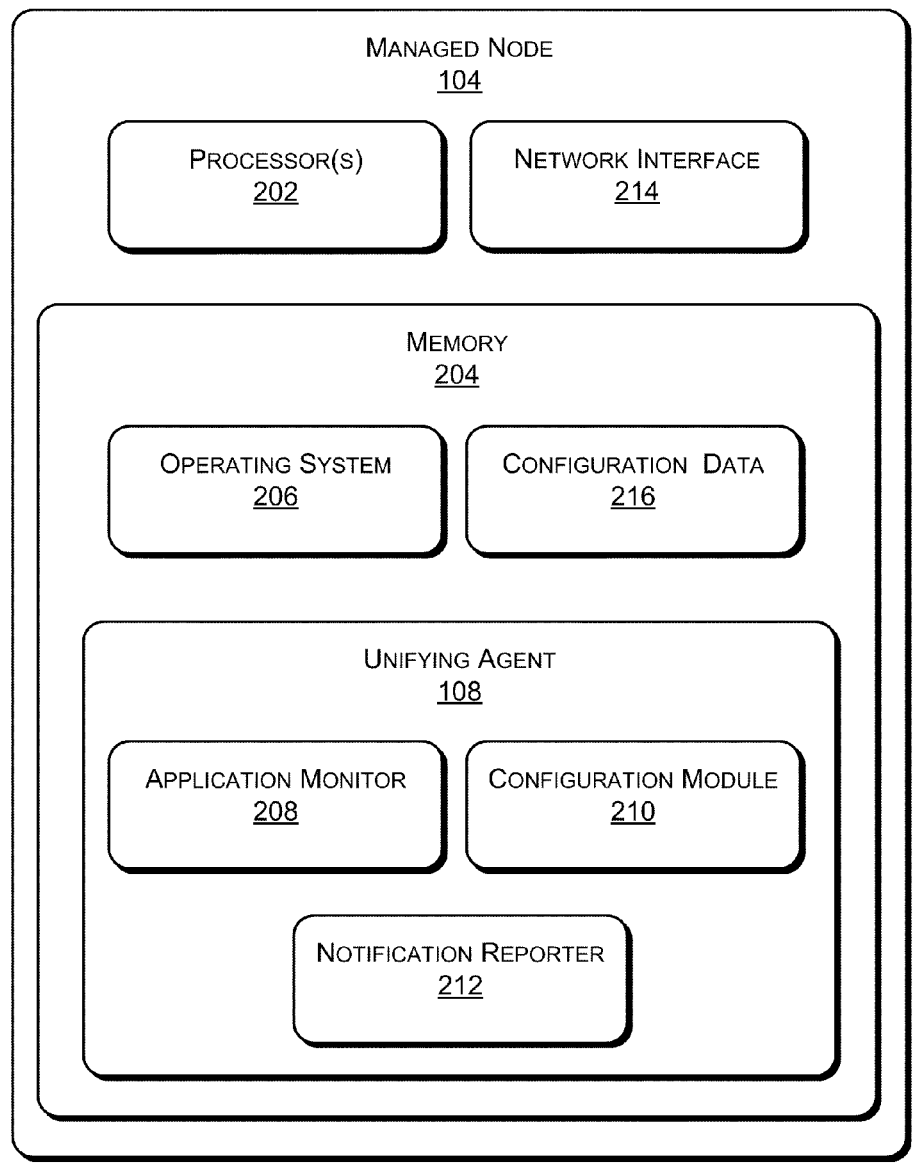
FIG. 2 is an implementation of a managed node employing an exemplary unifying agent.

FIG. 2 shows an exemplary managed node 104 according to an embodiment. The managed node 104 includes one or more processor(s) 202 coupled to a memory 204. The processor(s) 202 may include, for example, microprocessors, microcomputers, microcontrollers, digital signal processors, central processing units, state machines, logic circuitries, and/or any devices that manipulate data based on operational instructions. The processor(s) 202 are configured to fetch and execute computer program instructions stored in the memory 204. The memory 204 includes, for example, one or more combination(s) of volatile memory (e.g., RAM) and non-volatile memory (e.g., ROM, Flash etc.). The memory 204 stores computer executable instructions and data for identifying changes to be implemented on the managed node 104 and collecting configuration details of the managed node 104.

In an exemplary implementation, the memory 204 includes an operating system 206 that provides a platform for executing applications on the managed node 104. The memory 204 further includes a unifying agent 108 configured to notify a status of both the managed node 104 and the distributed network to the management server(s) 106. The unifying agent 108 also collects and sends the configuration details of the managed node 104 to the management server(s) 106.

The unifying agent 108 includes an application monitor 208, a configuration module 210, and a notification reporter 212. Moreover, a network interface 214 exposes the capability of the managed node 104 to interface with the network 102 or other managed nodes 104.

The management server(s) 106 set in an operating mode may instruct the managed node 104 to provide status and configuration of the managed node 104. The unifying agent 108 processes the instruction and instructs the application monitor 208 to monitor the status of the managed node 104. Additionally, the unifying agent 108 triggers the configuration module 210 to gather configuration data 216 associated with the managed node 104. The configuration data 216 may include a number of applications running, a list of hardware components installed, processor capacity, storage capacity, and disk configuration.

The application monitor 208 gathers the status of the managed node 104 and sends the status to the notification reporter 212. The notification reporter 212 analyzes the status and notifies the management server(s) 106 about the performance of the managed node 104, faults in the applications and hardware, etc. For example, the notification reporter 212 examines the status of the managed node 104 and notifies the management server(s) 106 about performance of each application running, performance of the hardware components, and/or any faults occurring in the hardware components and software applications, etc.

The notification reporter 212 may send alert signals to management server(s) 106 upon detecting faults that occur in the managed node 104 and/or the distributed network. The faults may include, for example, an abrupt shut down of the managed node 104, application errors, hardware breakdowns, and physical damages occurring to the hardware parts. Such alert signals enable the IT administrator to take necessary actions.

The notification reporter 212 may be configured to identify the state of the managed node 104, which denotes the health of the managed node 104. The health of the managed node 104 may depend upon factors such as performance of the hardware components and software applications installed. The state of the managed node 104 can be measured as a percentage of the health of the managed node 104. For example, the notification reporter 212 may gather information from the application monitor 208 and identify the state of the managed node 104.

The configuration module 210 sends the configuration data 216 to the management server(s) 106. The management server(s) 106 receives the status and the configuration data 210 and displays the status to the user or IT administrator. The user can alter the mode of operation of the management server(s) 106 to a changing mode. In the changing mode, the IT administrator analyzes the status and the configuration data 210 and decides upon selected changes to be implemented on the managed node 104 and distributed network. The selected changes may include adding more hardware support for operation of the applications, installing more applications, etc.

The applications operating in the managed node 104 may use a large percentage of CPU (central processing unit) capacity. In such a case, status depicting the percentage of CPU utilization and information related to the configuration of the CPU can help the user to determine the selected changes that can be implemented in the managed node 104 to reduce the excess CPU usage.

Once the selected changes are determined, the management server 106 creates change orders based on inputs from the user. The change order is a set of instructions that characterizes a work flow to be followed to implement the selected changes and update a configuration management database (CMDB) of the implementation of the selected changes. The manner in which the selected changes are determined and the change orders are created are explained in detail under section "Exemplary Unified Console."

The management server(s) 106 sends the selected changes and the change orders to the unifying agent 108. The unifying agent 108 receives and reviews the selected changes and the changes orders. The unifying agent 108 implements the selected changes in the managed node 104 based on the change orders. The application monitor 208 identifies whether the selected changes have been implemented or not and sends a status of the selected changes to the notification reporter 212. The status provides information as to whether the selected changes are implemented or not. The notification reporter 212 accordingly reports the status to the management server(s) 106.

The application monitor 208 may be configured to continuously and/or periodically monitor the number of selected changes implemented and the implementation stage of the selected changes based on the instructions received by the unifying agent 108 from the management server 106. The implementation stage denotes the percentage of implementation of the selected changes.

The unifying agent 108 compares the selected changes with the configuration data 216 to identify whether the selected changes can or cannot be implemented. The unifying agent 108 then informs the management server(s) 106 whether the selected changes can be implemented or not. For example, the unifying agent 108 compares the selected changes suggested by the management server(s) 106 against the configuration data 216 to identify whether the selected changes are feasible or not. If the selected changes are found to be not feasible, the unifying agent 108 rejects the selected changes. If found feasible, the selected changes are implemented.

Once the selected changes are implemented, the notification reporter 212 notifies the management server(s) 106 about the implementation of the selected changes. Based on the instructions present in the change orders, the unifying agent 108 updates the CMDB with the implementation of the selected changes. Thereafter, the user sets the management server(s) 106 in an operating mode. The management server(s) 106 continue to monitor the managed node 104 and distributed network.

Exemplary Unified Console

Figure 3:
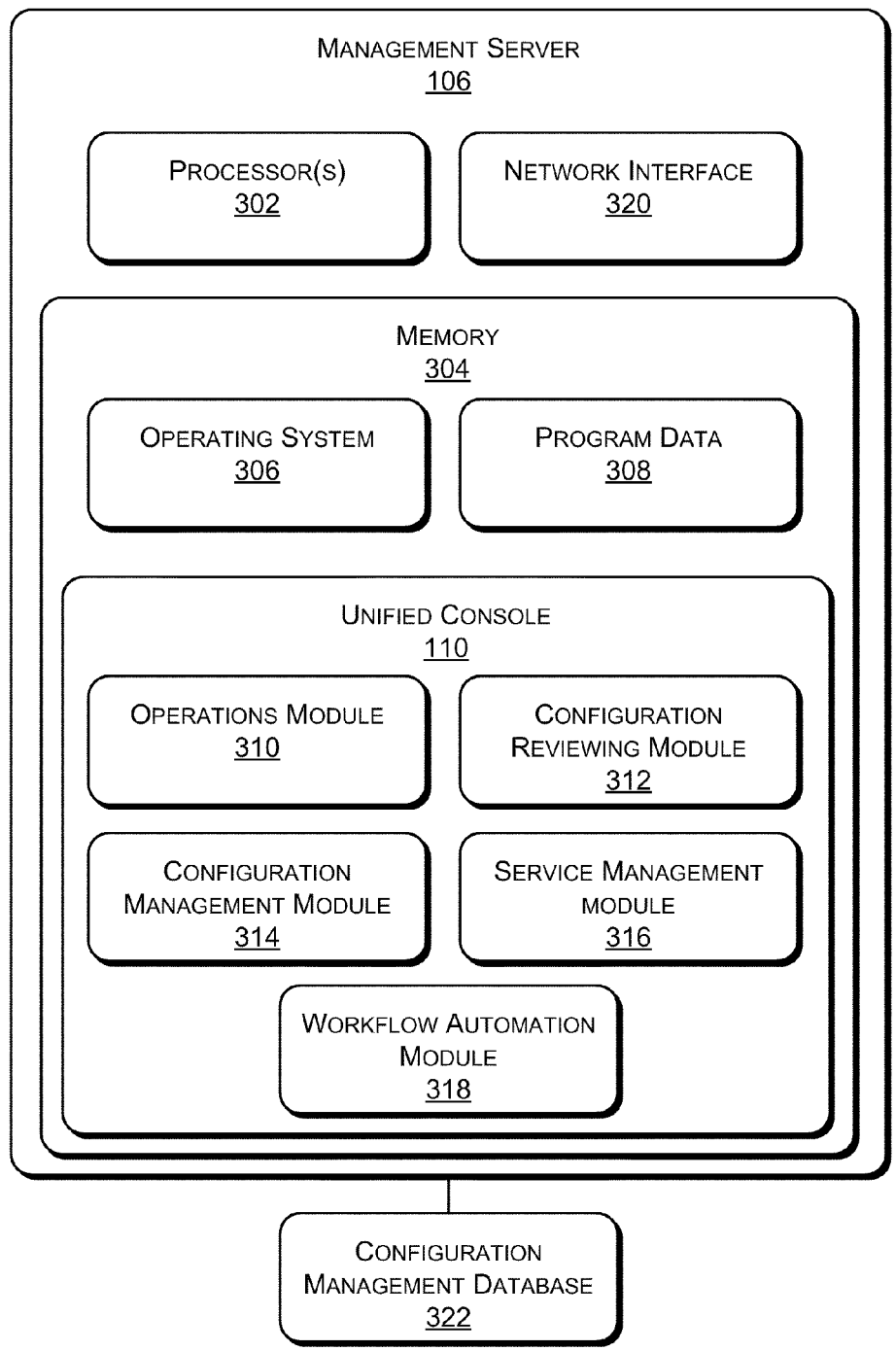
FIG. 3 is an implementation of an IT management server employing an exemplary unified console.

FIG. 3 illustrates a management server 106, according to an embodiment. The management server 106 includes one or more processor(s) 302 coupled to a memory 304. The processor(s) 302 may include, for example, microprocessors, microcomputers, microcontrollers, digital signal processors, central processing units, state machines, logic circuitries, and/or any devices that manipulate data based on operational instructions. The processor(s) 302 are configured to fetch and execute computer-program instructions stored in the memory 304. The memory 304 includes, for example, one or more combination(s) of volatile memory (e.g., RAM) and non-volatile memory (e.g., ROM and Flash memory, etc.). The memory 304 stores computer executable instructions and data for deploying changes in the applications and hardware features in the managed nodes 104.

In one implementation, the memory 304 includes operating system 306 providing a platform for executing applications on the network element. The memory 304 further includes a unified console 110 capable of planning and executing changes in a unified manner based on the status of the applications and hardware features and the configuration data 216 associated with the managed nodes 104 in the system 100.

The unified console 110 includes an operations module 310, a configuration reviewing module 312, a configuration management module 314, a workflow automation module 316, and a service management module 318. Any data used for assisting the execution of the unified console 110 received from the managed nodes 104 is stored in the program data 308 for future inferences. A network interface 320 exposes the capability of the management server(s) 106 to interface with the network 102 or other managed nodes 104.

The unified console 110 may be distributed over multiple management servers 106. The unified console 110 maintains a proactive approach in implementing the selected changes of the IT administrator for the whole, network or a part thereof.

In an implementation, the unified console 110 incorporates a "Unified" or a "Versatalist" approach to operate, support, plan and make the selected changes to the managed nodes 104. Once the management server 106 is set in the operation mode, the operations module 310 in the unified console 110 sends a request to one or more of the managed nodes 104 for the status of the software applications and hardware components, and the configuration data 216. Upon receipt of such a request, the unifying agent 108 sends the status of the software applications and hardware components and the configuration data 216 to the operations module 310 to be stored in the program data 308. Therefore, management server 106 serves as an aggregation and coordination point for the status of the software applications and hardware components, and the configuration data 216.

The operations module 310 sends the status of the software applications and hardware components and the configuration data 216 to the configuration reviewing module 312. The configuration reviewing module 312 reviews the status of the software applications and hardware components, and the configuration data 216 and displays it to the user through a user interface. In another embodiment, the configuration reviewing module 312 analyzes the configuration data 216 of the managed nodes 104 received at various intervals and maintains a report of deviations. The deviations refer to the change in the configuration data 216 from the last received configuration data 216.

The user reviews the status of the software applications and hardware components and the configuration data 216 to decide upon a configuration change to be implemented in the enterprise network. The configuration management module 314 receives a request for the appropriate configuration change from the user. The configuration management module 314 examines the request and provides the User with one or more models of any software applications and hardware components that can be included in the present network. The models may depict several different configurations of other networks and software applications and hardware components that can be included in the present network.

The models may include details of the number of computing devices present, details of the connections between the computing devices, kinds of processors used in each computing devices, memory capacity of the computing devices, etc. Such a method of selecting a model can reduce the time spent in reading and interpreting manuals and guidelines for identifying an appropriate model. The appropriate model may be selected based on information provided by the User to a set of questions. The set of question may be provided by the configuration management module 314 through a user interface to the User. The user interface that enables selection of appropriate model is described in detail "Exemplary User Interfaces".

The models are stored in a CMDB 322 associated with the management server 106. The CMDB 322 is an object oriented database that may include data regarding various views of the enterprise network or distributed network, relationships between various models, pictures of how a deployed model is in a real world, i.e. "issness", pictures of how the deployed model should be in a real world, i.e. "oughtness", pictures of how the model deployed in the past was in a real world, and pictures of how the model that may be deployed in future would be in a real world.

In an exemplary implementation, the configuration management module 314 may review various views of the enterprise network for selecting the appropriate model. The various views may include details about a relationship between a web based application in the enterprise network and a particular web service, location of computing devices in the enterprise network, peculiarities of a set of applications in a set of computing devices of the enterprise network, etc. The configuration management module 314 reviews the various models and the relationships between the models to identify the appropriate model.

The configuration management module 314 may characterize each model into various deployment profiles. The deployment profiles may include various configurations of each model. The deployment profiles are discussed in detail below in the section titled "Profile Based Guidance for Selecting an Appropriate Configuration."

Profile Based Guidance for Selecting an Appropriate Configuration

The configuration management module 314 provides various deployment profiles for each model depending on a variety of intended configurations that may be used by the user. Each deployment profile may be applied when a particular list of criteria is satisfied. The configuration management module 214 presents a list of criteria for each deployment profile to the user. The user reviews the list of criteria and selects a deployment profile having an acceptable list of criteria. The list of criteria may include criteria pertaining to the size of the enterprise network that may be implemented, the type of servers that may be used, the number of transactions that may be processed, the number of applications that may be used, and the type of security requirements that may be essential. Once a deployment profile is selected, administration policies associated with the selected deployment profile are set by the configuration management module 314.

For example, each deployment profile includes a list of criteria to be reviewed by the user prior to selection. Each deployment profile may present a list of criteria such as: "at most 10-15 users can use a selected application", "users can use only a particular type of server module and server", "a certain number of transactions can be processed per day", and "a certain amount of data can be imported". The user may select a deployment profile if the list of criteria is found to be satisfactory. Such a presentation based on the list of criteria defined by the user depicts an interview process that reduces the time consumed in interpreting guidelines for selecting a deployment profile from a manual. The method of interviewing the user for selecting the selected deployment profile is described in detail "Exemplary User Interfaces".

The configuration management module 314 also facilitates the user to review and modify administration policies of the selected deployment profile. The administration policies may include configuration policies (i.e., software and hardware configurations), health policies, network policies, and protection and recovery policies.

The configuration policies are policies associated with a system's configuration according to the list of criteria defined by the selected deployment profile. The system's configuration may include information about, for example, software applications that can be used, types of processors that can be used, and types of disk configurations that can be allowed.

For example, the user may review the configuration policies pertinent to both the software applications and the hardware components that can support the selected deployment profile, such as Microsoft® Dynamics® GP software application profile. The software applications are configured may include, for example the Microsoft® Dynamics® GP application, a Microsoft® Windows® Server application, and other supporting applications. The hardware components that are configured may include processor types and disks. The user can modify the configuration policies if needed.

The health policies are policies associated with the overall health of the software applications and the hardware components in the enterprise network. The health policies include policies related to the level of security, the configuration of the software applications and the hardware components under use, the amount of data associated with the performance of the software applications and the hardware components, the spontaneity of responses to transactions occurring between the software applications and the hardware components, the rate of generation of alerts for all conflicts and errors occurring in the enterprise network, and the types of responses that may be generated for the errors in the software applications and the hardware components.

The network policies include policies related to the configuration of the enterprise network. The network policies may include selecting types of networks and other network constraints. The protection and recovery policies relate to protection of the software applications and the hardware components, recovery of files and other documents used by the applications, and the like.

The configuration management module 314 can provide the user a style for defining the administration policies for all types of situations. For example, a Microsoft® Outlook® messaging service style policy definition can be used for purposes like client targeting, deployment mode, and scheduling. In such an instance, the user interface allows the user to choose appropriate behaviors for the various situations in a Microsoft® Outlook® messaging service style. The manner in which the configuration management module 314 provides a Microsoft® Outlook® messaging style policy definition is described in detail under section "Exemplary User Interfaces."

The configuration management module 314 reviews the selected deployment profile and the administration policies to create one or more change orders. As mentioned earlier, the change order defines the work flow to be followed to implement the selected changes as well as a query to update the CMDB 322 about how the model of the network changed on a successful implementation of the change order. The change order is created based on a change template. The change template is a form that can be developed by a user such as an IT administrator. The form may include a set of questions addressed to the user. The change templates may be associated with a configuration change, a hardware deployment, a minor change, and/or a software deployment. The configuration management module 314 provides one or more change templates to the user. The user selects the right change template based on the selected deployment profile. In an implementation, the configuration management module 314 enables the user to create new change templates.

The selected change template lists out the set of questions to be addressed by the user. The user passes appropriate parameters in response to the questions. The parameters may include name of the applications, name of the computing devices, and name of the network in which the selected changes are to be implemented, etc. The configuration management module 314 creates the change order in the shape of the selected change template when the parameters are entered.

The system 100 automatically may also customize the behavior of an instance of the change order when some of the parameters refer to objects in the CMDB 322. For example, a change order to install a three tier application in the network may use objects such as the name of the application, the name of front-end and mid-tier clusters, and the name of a database server. The front end and mid tier clusters may include multiple nodes or computing devices connected to the database server over a network. The parameters input by the user may refer to the objects that are previously stored in the CMDB 322. Thus the system 100 can automatically create or customize the change order. The user may be provided with a facility to modify the change template. The modified template is then used to create a modified change order.

The change order created from the change template can automatically define activities for implementing the changes, updating the CMDB 322, and installing and configuring nodes in the system 100. The process of installing and configuring nodes include configuring the appropriate data bindings and opening the right ports in a firewall. For example, a change order for installing an application in the network configures all the nodes in each and every cluster of the network. The administrator does not have to worry about the number of nodes in the cluster, or types of networks involved in interconnecting the nodes.

The configuration management module 314 may compare the change order with the configuration data 216 stored in the CMDB 322 to identify whether the change order is satisfactory. If the change order is found satisfactory, then it is declared valid and is later implemented. Alternatively, if the change order is found unsatisfactory, then it is declared invalid and the configuration management module 314 modifies the change order by re-selecting the changes.

The configuration management module 314 implements the selected changes based on the steps defined in the change order, and thereafter updates the CMDB 322 with the implementation of the selected changes. For example, the configuration management module 314 registers the selected changes in a database prior to implementing these changes.

The updates made in the CMDB 322 may include, for example, a picture of the deployed model of the network upon implementing the selected changes. The picture of the deployed model may be separate from a picture depicting how the deployed model can be in a real world. Thus, such updates assist the system 100 in monitoring the configuration of the network and conducting audits by reviewing the pictures of the deployed model.

In an exemplary implementation, the updates present in the CMDB 322 enables the system 100 to determine appropriateness of the software applications and the hardware components in the network. In such an implementation, the configuration management module 314 may also trigger the service management module 316 to examine the network based on the updates in the CMDB 322. The service management module 316 may evaluate the appropriateness of the software applications and the hardware components in the network to identify a best fit placement of the software applications and the hardware components. The process of determining the best fit placement for the software applications and the hardware components is discussed in detail below in the section titled "Profiling of Discovered Machines to suggest Best Fit Placement of Components."

Profiling of Discovered Machines to Suggest Best Fit Placement of Components

The service management module 316 reviews the network with the selected changes to gather information of the software applications and the hardware components for determining appropriateness of the software applications and the hardware components in the network. The appropriateness of the software applications and the hardware components is measured to identify how effectively and efficiently the software applications and the hardware components can fit into places in the present enterprise network or other networks.

The service management module 316 assigns grades to the software applications and the hardware components based on their expected performances at places where they are deployed. As an example, the grades assigned may be a star grading system and include the following scores or values: 5*, 4*, 3*, 2*, and 1*.

For example, when the software applications and the hardware components are deployed at a place in the network that enables best possible performance, then such deployment of the components or the applications is assigned a grade 5*. Whereas, when a component or application is deployed at a place in the network where the performance is not up to standards, then the component or application may be assigned a comparatively lower grade such as 1* or 2*. The user can replace old software applications and the hardware components with some other software applications and the hardware components that show an increased performance. Such grading system enables the user to identify the best places where the software applications and the hardware components can be placed.

It may be noted that the best possible place for placing the software applications and the hardware components and the best software applications and the hardware components that can be placed are not selected from options available in the CMDB 322, but are based on the software applications and the hardware components chosen by the administrator. In an implementation, some software applications and the hardware components may be assigned a negative star grade, for example, −1*, −2*, −3* showing that such hardware components and applications when placed in the network can break the network or create problems in the network. In such cases, the service management module 316 directs the configuration management module 314 to identify new software applications and hardware components that can be placed in the network.

The management server 106 operates in the operation mode when the selected changes are implemented and the updates are registered in the CMDB 322. In the operation mode, the operation module 310 invokes the unifying agents 108 to monitor and collect the status of the software applications and the hardware components present in the managed nodes 104. As mentioned earlier, the status includes the performance details of the software applications and the hardware components, health information of the software applications and the hardware components, etc. The performance details may include, for example, performance of the server as a server load and a load time.

The operations module 310 also receives and reviews the status of the software applications and/or hardware components. The operations module 310 provides the status in specific formats like graphical formats, tables, and so on, through a user interface to the user. Thus, the user continuously reviews the specific formats to identify faults, health of the system 100, deployment status of the selected changes, etc. The operations module 310 may send alert signals to the user about the faults that occur. The user receives the alert signals and takes actions to fix the faults. The method of representing the status and the performance details is explained in greater detail under section "Exemplary User Interface."

The operations module 310 may interact with the workflow automation module 316 to select and categorize the health information software applications and the hardware components. The health information is categorized as health status associated with software applications, processors, disk configuration, etc. The workflow automation module 316 prioritizes the health information based on business and process context and presents the health information as an incident, state, or root cause view to the user. The user reviews the health information and takes necessary steps to retain the system 100 in a healthy condition.

The user may identify whether any more changes for proper working of the system 100 are required. If any changes are needed, a process cycle involving selecting and implementing the selected changes and monitoring the system 100 are repeated. The process cycle is managed by the work flow management module 318, which controls the interactions between the various modules in the unified console 110.

Figure 4:
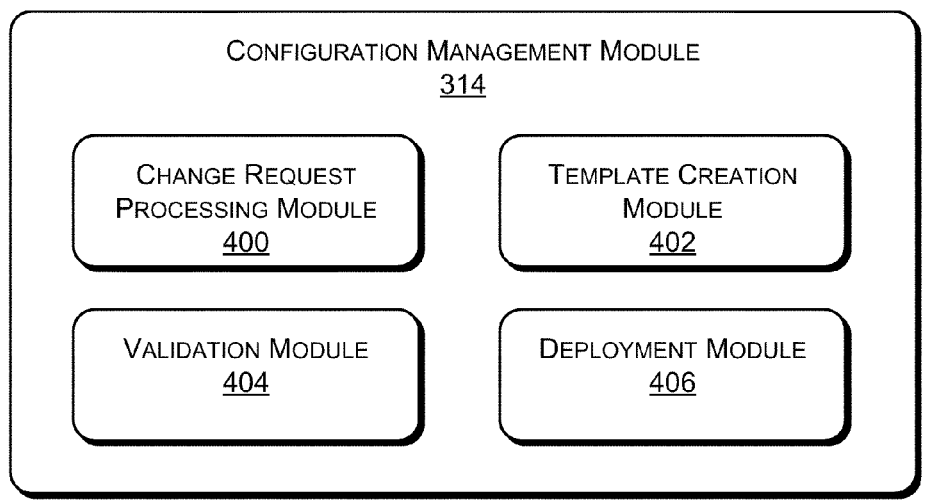
FIG. 4 is an implementation of a configuration management module according to one embodiment.

FIG. 4 illustrates an exemplary configuration management module 314. The configuration management module 314 includes a change request processing module 400, a template creation module 402, a validation module 404, and a deployment module 406. As discussed above, the unified console 110 facilitates the user to decide and implement the selected changes in the system 100.

The change request processing module 400 receives and reviews the request from the user to make the selected changes. The change request processing module 400 enables the user to select an appropriate model and a selected deployment profile based on the selected changes. The appropriate model and the selected deployment profile are then sent to the template creation module 402. The template creation module 420 displays a set of predefined change templates to the user through a user interface. A change template is selected by the user based on the appropriate model and the selected deployment profile.

In an implementation, the change request processing module 400 may receive a request for creating a change template from the user. The user may send such request consequent to analyzing the appropriate model and the selected deployment profile. In such a case, the change request processing module 400 triggers the template creation module 402 to provide provisions for creating the change template. The template creation module 402 automatically registers the change template in the CMDB 322. Such automatic updation of the CMDB 322 reduces the difficulty of manually updating frequently.

The configuration management module 314 processes the selected change template to create the change order defining the activities involved for implementing the selected changes. The validation module 404 approves the change order subsequent to validating the appropriate model by using various validators. The validators may be from any discipline that can operate on the appropriate model, such as cost validators, policy checkers, capacity checkers, and SLA checkers. The validators use multiple rule checks stored in the CMDB 322 to perform the validation. The multiple rule checks are predefined constraints that may include cost constraints, policy constraints, capacity constraints, and SLA constraints.

Each validator can work on the appropriate model individually prior to the approval of the appropriate model. For example, a cost validator can review the appropriate model to estimate costs of each software applications, hardware components, and time required to implement the selected changes. The cost validator compares the estimated cost with a predefined cost constraint stored in the CMDB 322. The predefined cost constraint denotes a cost that can be afforded. If the estimated cost is found to be less than or equal to the predefined cost constraint, the cost validator declares the appropriate model valid. Alternatively, if the estimated cost is more than the predefined cost constraint, the application model is declared invalid.

The change request processing module 400 sends the validated model to the deployment module 406 for deployment in the system 100. The deployment module runs a work change work flow that has activities that enact the changes on one or more managed nodes following a conditional path. The deployment module 406 may also send a message to a person to make the selected changes in the managed nodes 104. For example, a message including instructions for loading an application in the managed node 104 can be sent to an operator. The operator reviews the message and loads the application in the managed node 104.

Each change made in high level settings of any hardware component can configure all the settings of the hardware component based on the high level settings. For example, each main hardware component in an enterprise network is a composition of various sub-components. Changes made in the high level settings of the main hardware component based on the selected changes implement corresponding changes in the settings of the sub-components.

Exemplary User Interfaces

Figure 5A:
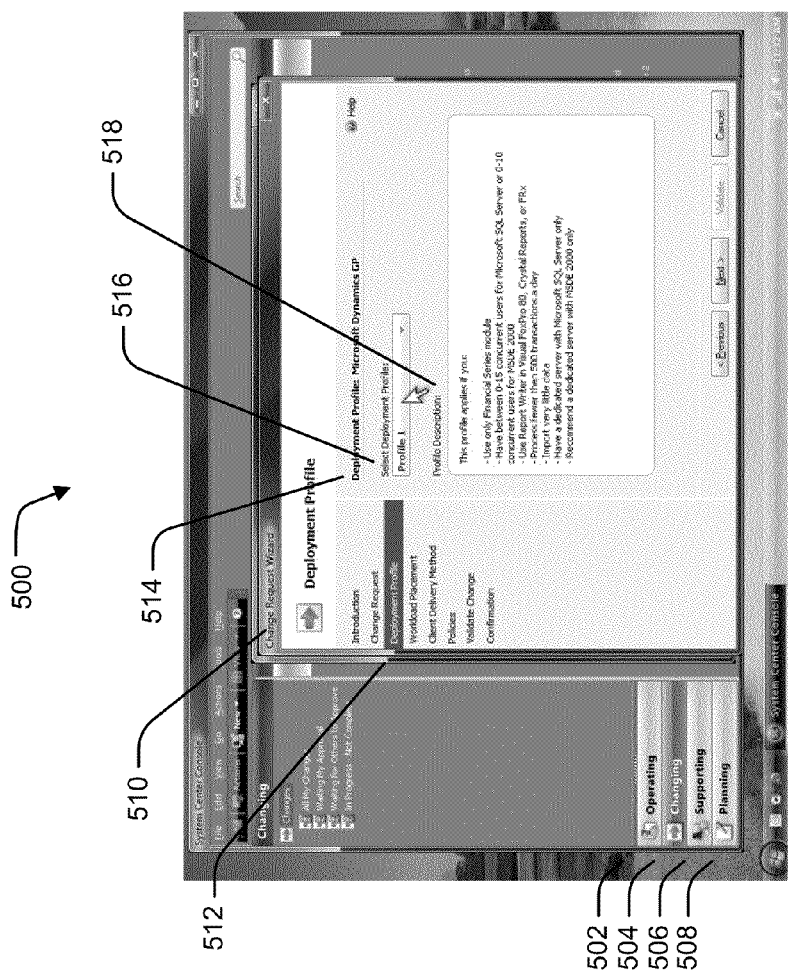
FIGS. 5A, 5B, 5C are exemplary user interfaces (UI) that facilitates selection of deployment profiles in an IT service management system.

FIG. 5A shows an exemplary user interface (UI) 500 enabling selection of deployment profiles in the system 100. The UI 500 has an operating tab 502, a changing tab 504, a supporting tab 506, and a planning tab 508. The operating tab 502 facilitates the user such as an IT administrator to monitor the performance of the managed nodes 104. The user selects the changing tab 504 to open a change request wizard 510 that enables the user to define the selected changes. The supporting tab 506 facilitates the user with the right to assign activities related to implementation of selected changes and other issues to people, resolve problems, and handle incidents in the system 100. The planning tab 508 enables the administrator to develop plans to implement the selected changes in a structured manner.

The user selects a deployment profile tab 512 present in the change request wizard 510 to open a deployment profile wizard 514. The deployment profile wizard 514 includes a select deployment profile tab 516 which, when selected by the user, displays a list of profiles. As mentioned previously, each profile has a list of criteria that needs to be satisfied for its implementation. The list of criteria associated with each profile is displayed in a profile description area 518 in the deployment profile wizard 516. For example, the UI 500 shows a deployment profile wizard 514 associated with the Microsoft® Dynamics® GP software application. The deployment profile wizard 514 shows profile 1 and a list of criteria associated with the profile 1 in the select deployment profile tab 516 and profile description area 518, respectively.

Figure 5B:
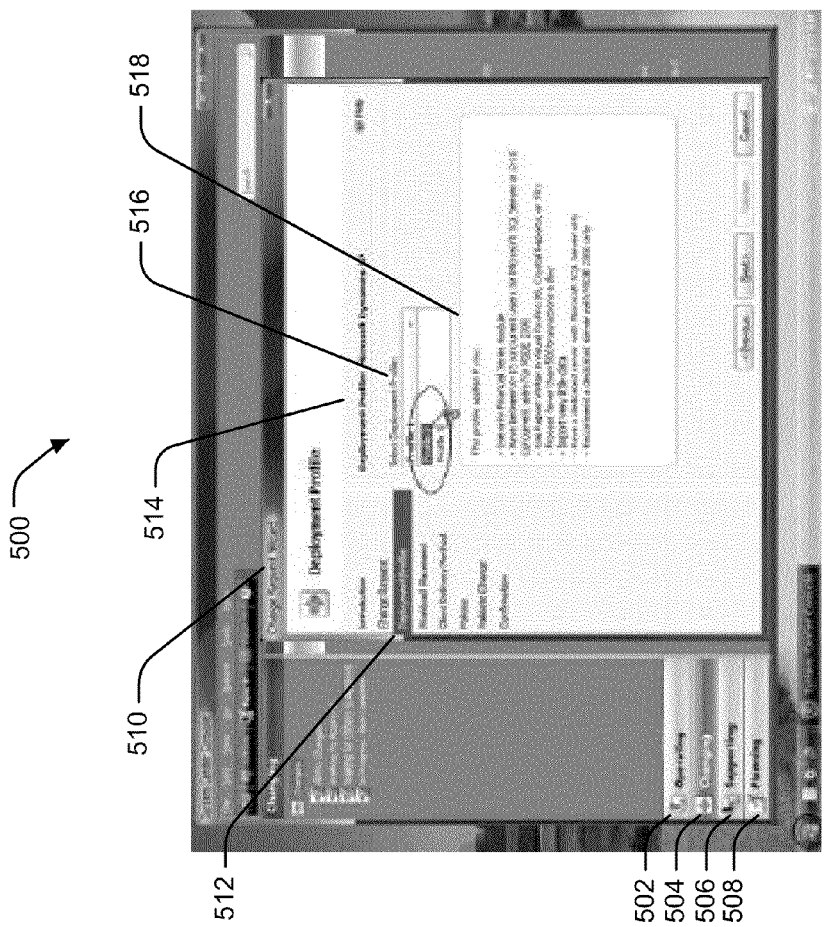

FIG. 5B shows the user interface (UI) 500 that enables the user to select a deployment profile from multiple deployment profiles. The UI 500 shows the select deployment profile tab 516 presenting the multiple deployment profiles namely profile 1, profile 2, and profile 3. Each deployment profile has a list of criteria mentioned in the profile description area 518. The user can pick each deployment profile and review the list of criteria associated with the deployment profile. The user selects a deployment profile whose list of criteria is acceptable.

For example, the UI 500 illustrates the user pointing at profile 2. The user reviews the list of criteria associated with the profile 2. The list of criteria may include criteria pertaining to the use of only financial servers, import of very little data, processing of less than 500 transactions a day, etc. The user selects the profile 2 if the list of criteria is applicable according to the appropriate model.

Figure 5C:
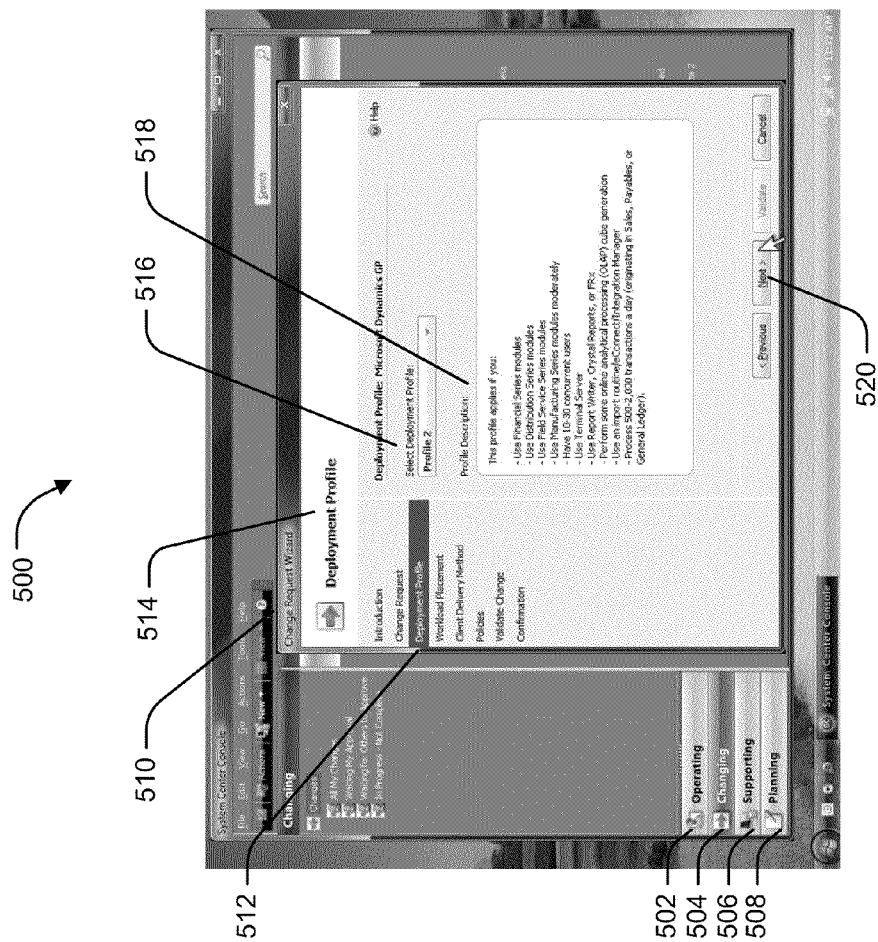

FIG. 5C illustrates the UI 500 facilitating to the user to confirm selection of a selected deployment profile. The UI 500 includes the select deployment tab 516 having the selected deployment profile. For example, the user opts for a profile 2 subsequent to reviewing and accepting a list of criteria mentioned in the profile description area 518. According to the list of criteria, the profile 2 can be applied when the following are used: financial series modules, distribution series modules, field service series modules, terminal servers, etc. The user selects a next tab 520 to completely select the selected deployment profile and to move to the next level of changes.

Figure 6A:
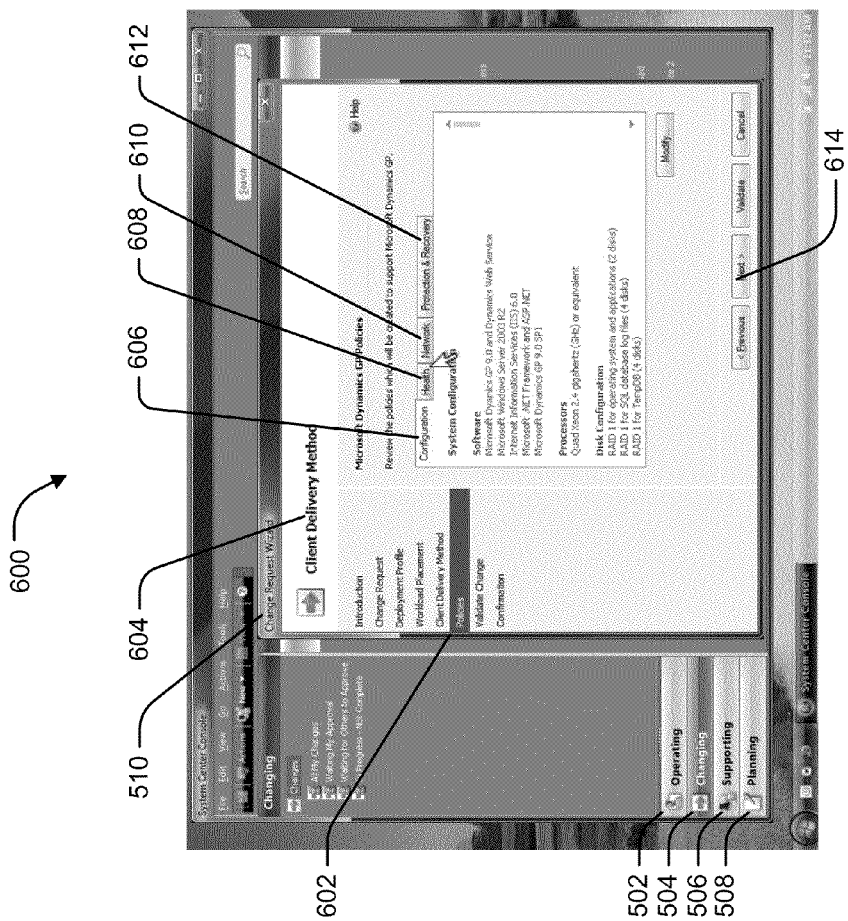
FIGS. 6A, 6B are exemplary user interfaces (UI) to support configuration of policies.

FIG. 6A illustrates an exemplary user interface (UI) 600 facilitating the user to assign administration policies associated with the appropriate model. The UI 600 shows the change request wizard 510 including a policies tab 602. The user selects the policies tab 602 to reach a client delivery method area 604. The client delivery method area 604 includes multiple policy tabs namely, a configuration tab 606, a health tab 608, a network tab 610, and a protection and recovery tab 612. Each policy tab when selected by user presents a description of the settings of the respective administration policy. The user can review the description and decide whether the settings are acceptable or not.

The configuration tab 606 when selected by the user shows the description of the settings of the configuration policy. The description of the settings may include, for example, the type of system configuration used, policy settings and other configuration settings. The user reviews the settings and decides whether the settings are acceptable or not. Similarly, the user can review the settings of other policy tabs as well. The user can select the next tab 614 when the settings associated with all the policy tabs are found acceptable.

Figure 6B:
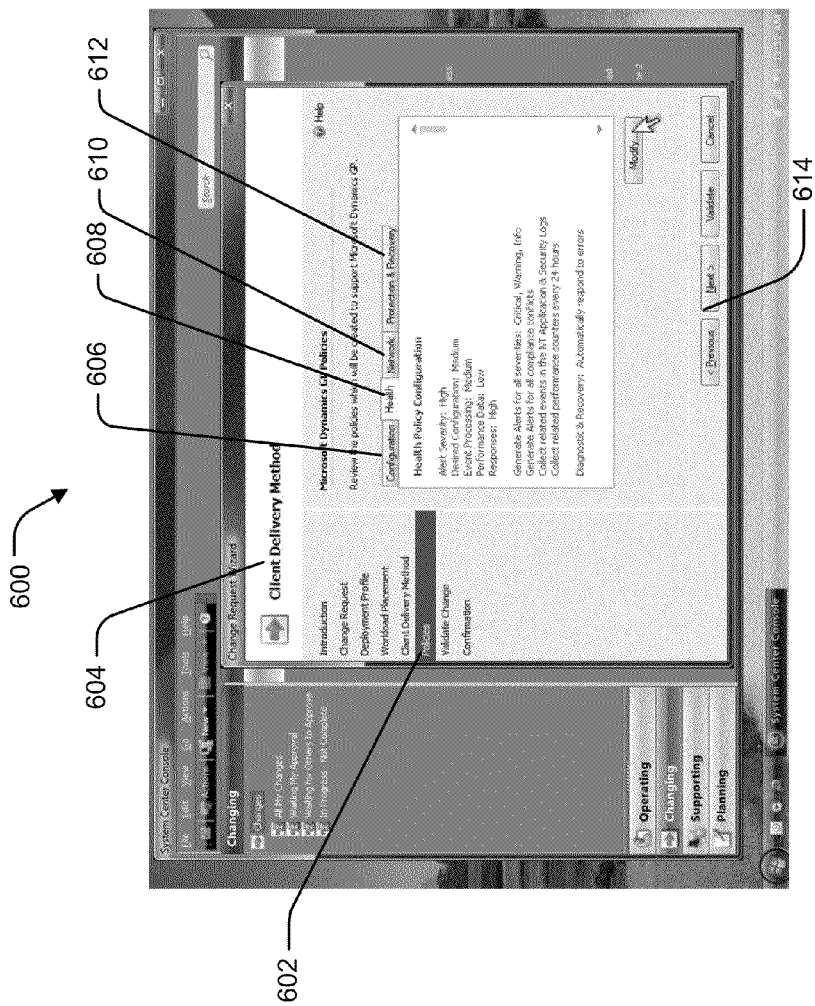

FIG. 6B illustrates an exemplary user interface (UI) 600 facilitating the user to decide the health policies associated with the appropriate model. The UI 600 shows the health tab 608 presenting a description of the settings of the health policy. The description may include, details pertaining to the frequency of alerts that may be send, the level of desired configuration and event processing that may be implemented, the level of performance data that may be collected, and the level of responses that may be required. The user reviews and decides whether the health policies are acceptable or not. The user selects the next tab 614 if the health policies are found to be satisfactory.

Figure 7A:
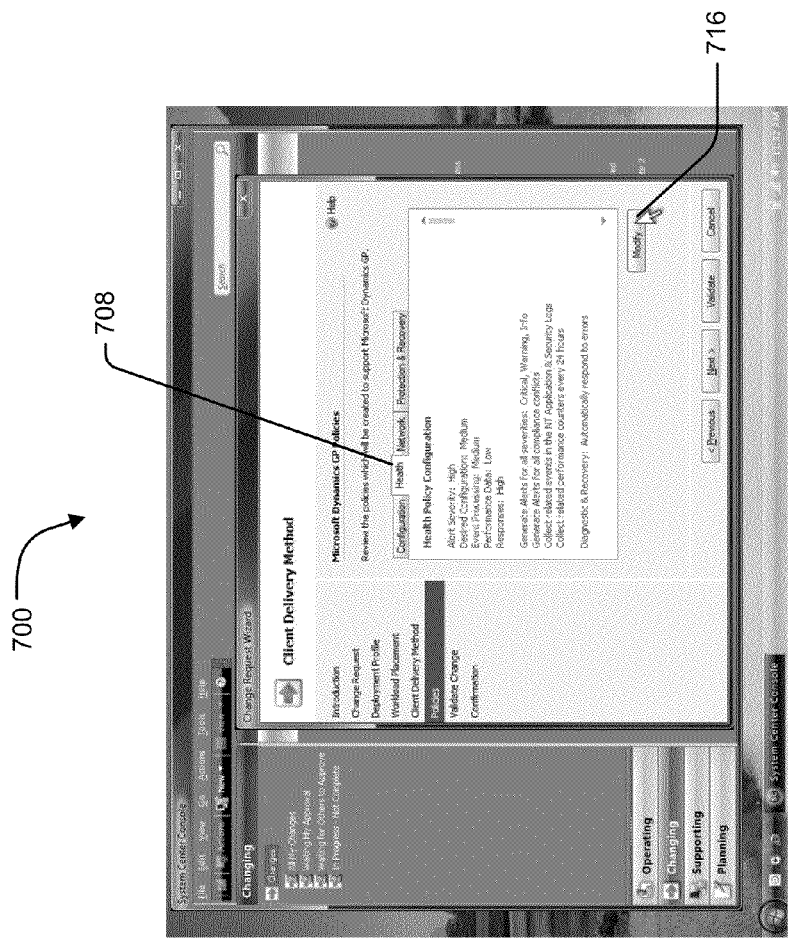
FIGS. 7A, 7B, 7C, 7D, 7E, 7F, 7G, 7H, 7I, 7J, 7K, 7L are exemplary user interfaces (UI) to support authoring of flow based configuration policy templates and health models.

FIG. 7A shows an exemplary user interface (UI) 700 enabling the user to modify the settings associated with the administration policies. The user reviews the setting associated with the configuration policy, the health policy, the network policy, and the protection and recovery policy to determine whether the settings are acceptable. In the UI 700, the user selects the health tab 708 and reviews the settings associated with health policy. The user modifies the settings using a modify tab 716 present in the UI 700 when the settings are found unsatisfactory. The modifications made in the settings may include changing the software applications running, changing the processors used, and changing other system configurations.

Figure 7B:
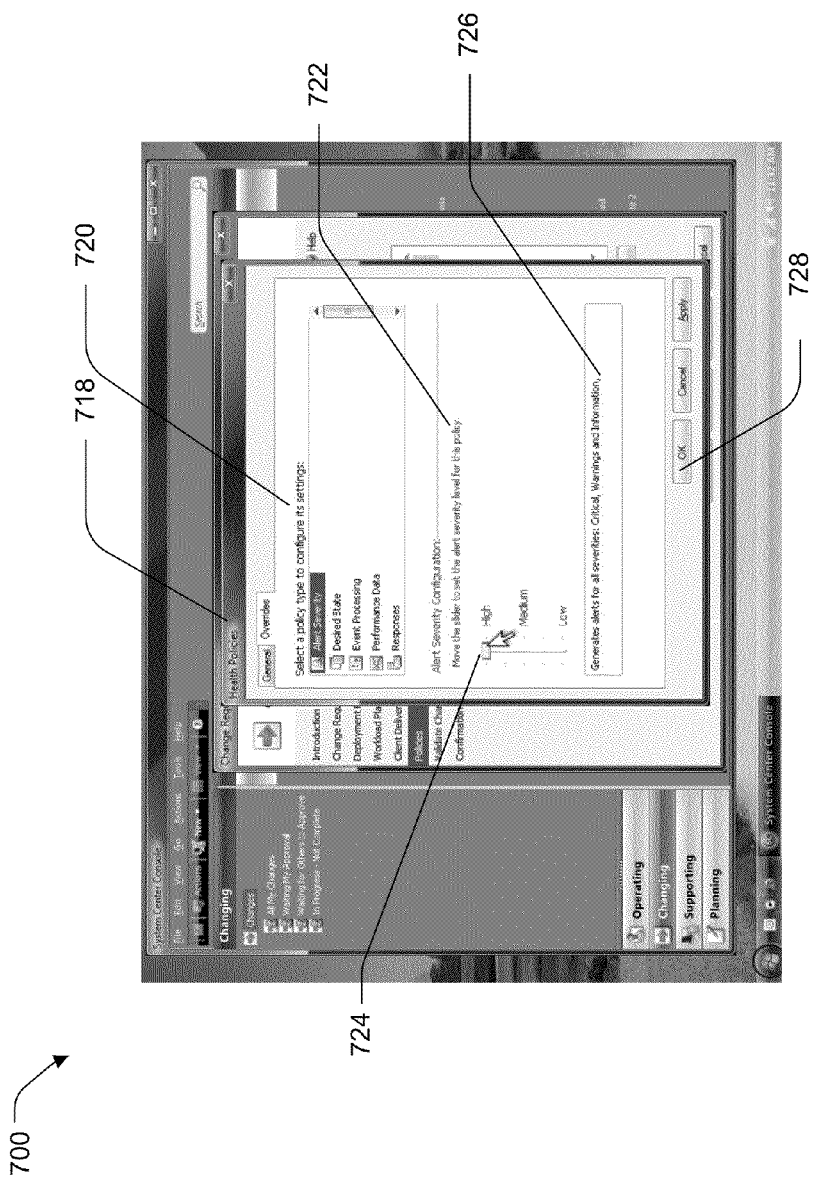

FIG. 7B illustrates the UI 700 depicting a process of modifying the health policies. The user selects the modify tab 716 (as shown in FIG. 7A) to open a health policy modification wizard 718. The health policy modification wizard 718 includes a policy listing area 720 and a policy modifying area 722.

The policy listing area 720 presents a list of policy types namely, alert severity, desired state, event processing, performance data, and responses. The user selects the alert severity policy type as displayed in the UI 700. The policy modifying area 722 includes a level adjusting tab 724 for changing the level of alert severity to "high", "medium", "low." The level of alert severity determines the level of alert signals that the managed system will notify the user on. An information display area 726 displays the level of alert security and information.

As shown in the UI 700, the user uses the level adjusting tab 724 to select a high level of alert severity. The information display area 726 shows that the system 100 may generate alert signals for all critical severities and warnings, and provide information of the critical severities to the user. The information of critical severities may include reasons for generation of critical severities, origin of critical severities, etc. The user selects an OK tab 728 if high level of severity is acceptable.

Figure 7C:
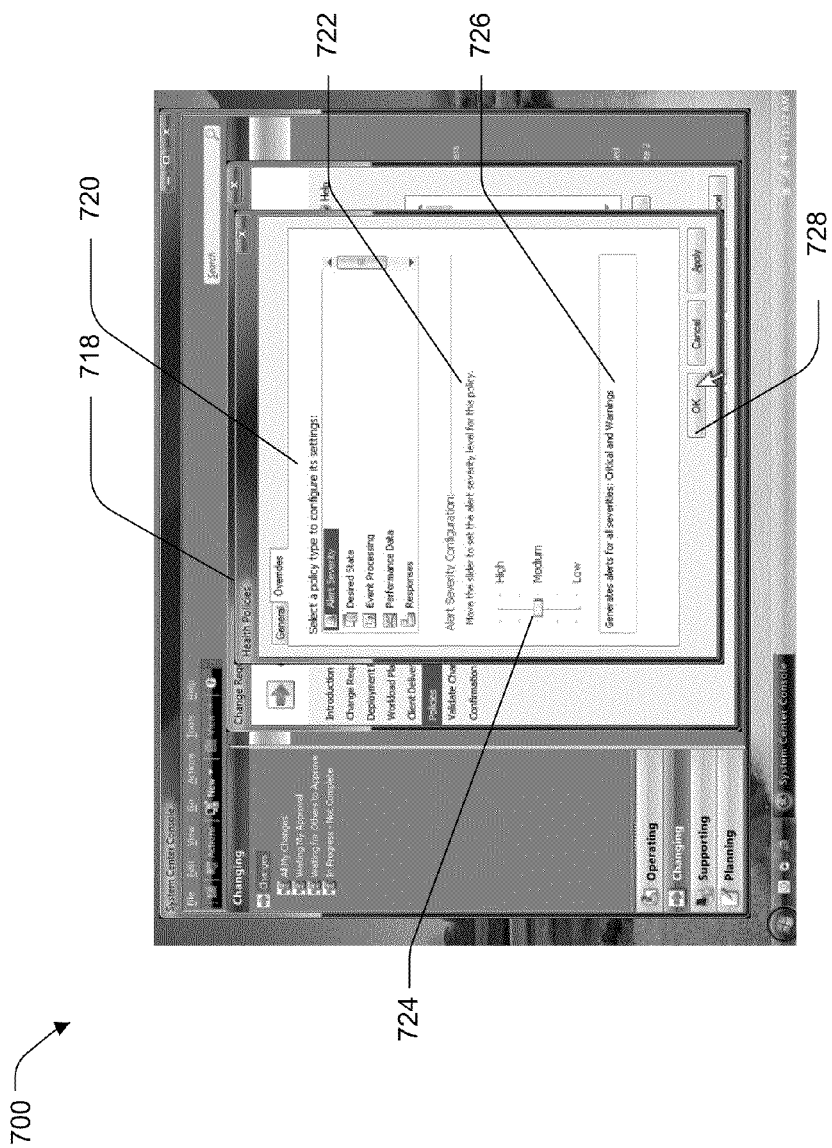

FIG. 7C illustrates the UI 700 enabling the user to set a medium level alert severity. The UI 700 shows the policy modifying area 722 where the user sets the level adjusting tab 724 to a medium level. The information display area 726 shows that the managed system may generate alert signals for all severities and warnings that are above medium severity. The user selects an apply tab 728 when the level of alert security is found acceptable.

Figure 7D:
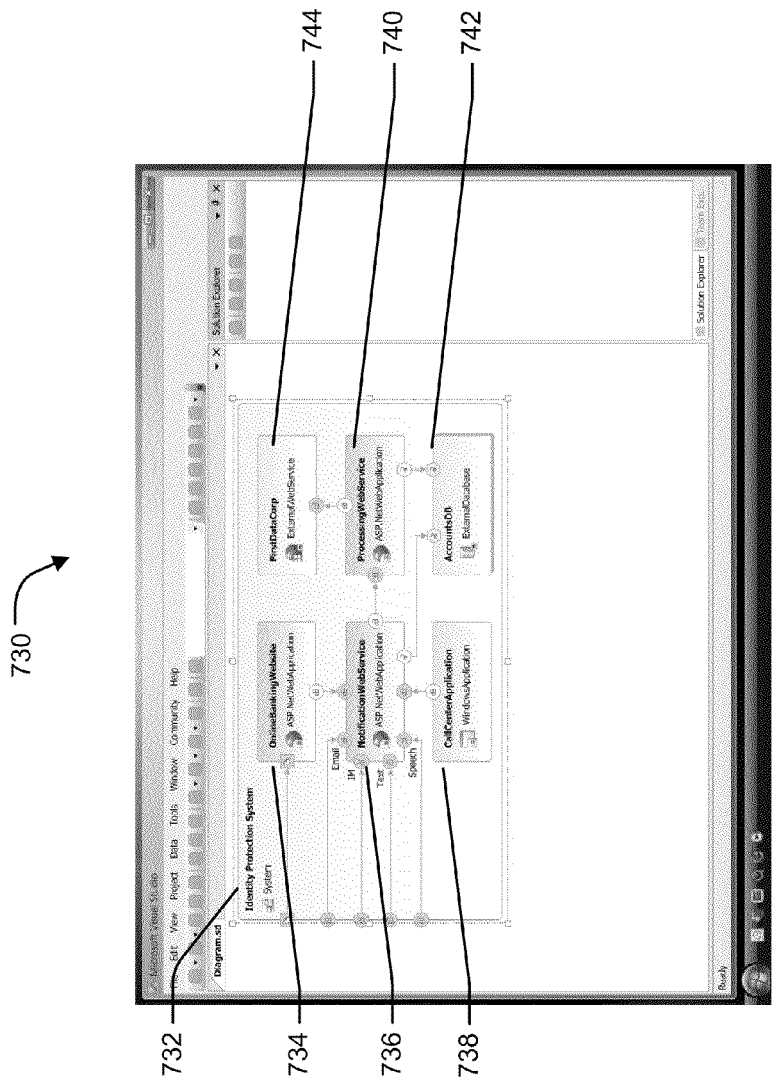

FIG. 7D illustrates an exemplary user interface (UI) 730 supporting a flow based configuration of policies (related to security in this case) for selecting a large number of settings in a consistent manner. The distributed applications may be made from a large number of high level components, which in turn can themselves be recursive compositions of other low level components. In such a case, each setting of the low level components may self configure based on some high level settings associated with the high level components that make sense for the overall application. In an implementation, a user may be able to override a detailed setting of the components as long as the override does not violate system constraints. Therefore, at the time of composition of the individual settings, the settings may be defined in terms of overall settings using a flow expression. Some constraints may also be expressed using a constraint language to disallow breaking overrides.

The Authoring UI 730 shows the authoring experience for an application model and all the meta data needed to manage it including config policy templates and health models. The particular application is an identity protection system 732 including various components such as an online banking website 734, a notification web service 736, a call center application 738, a processing web service 740, an accounts database 742, and a first data corp 744. The online banking website 734 facilitates customers to access their bank accounts. The online banking website sends customer alert notification preferences. The processing web service looks at every transaction reported by first data and updates the accounts database 742 with information leading to detecting a suspicious transaction. The Notification webservice sends a fraud alert notification by the user preferred method, and if no such preferences are set, reverts to the manual process via the call center.

Figure 7E:
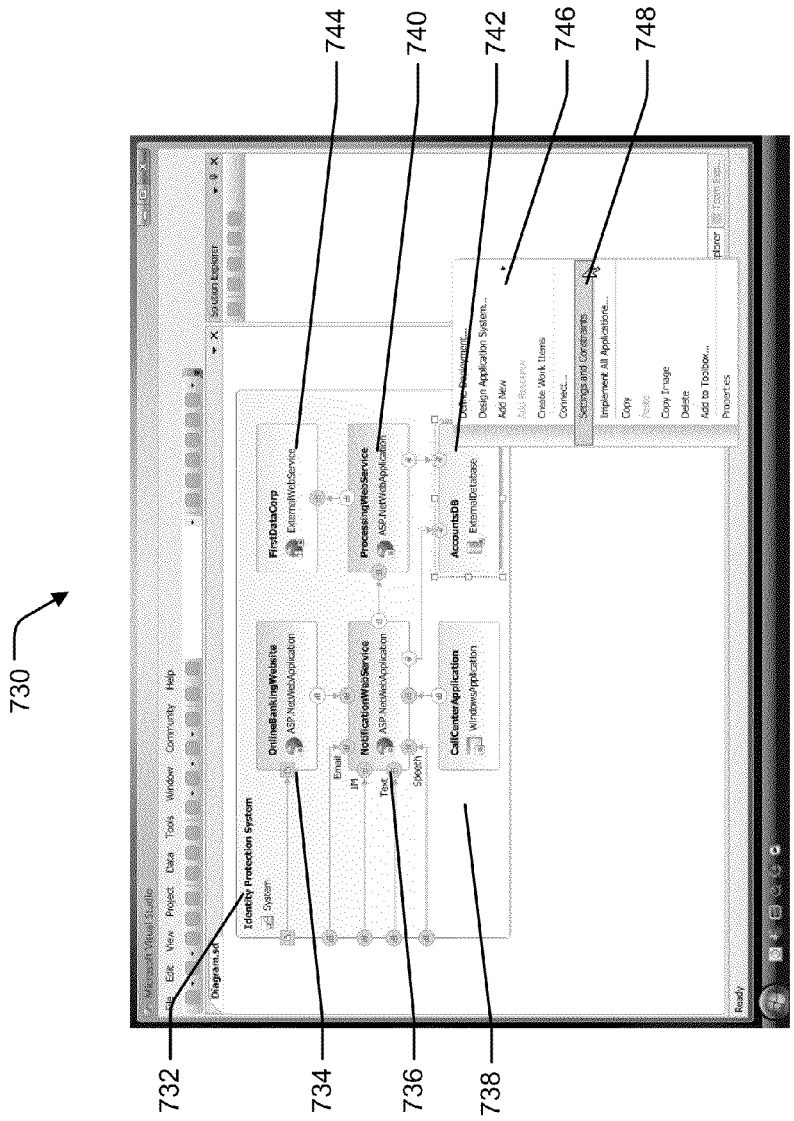

FIG. 7E shows the UI 730 enabling an user to make modifications in settings and constraints. The UI 730 shows the user clicks on the accounts database 742 to open tree selection control 746 including various options like define deployment, design application system, create work items, implement all applications, settings and constraints, etc. The user selects a setting tab 748 to open a setting wizard. The setting wizard enables the user to alter the settings and constraints of the accounts database 742.

Figure 7F:
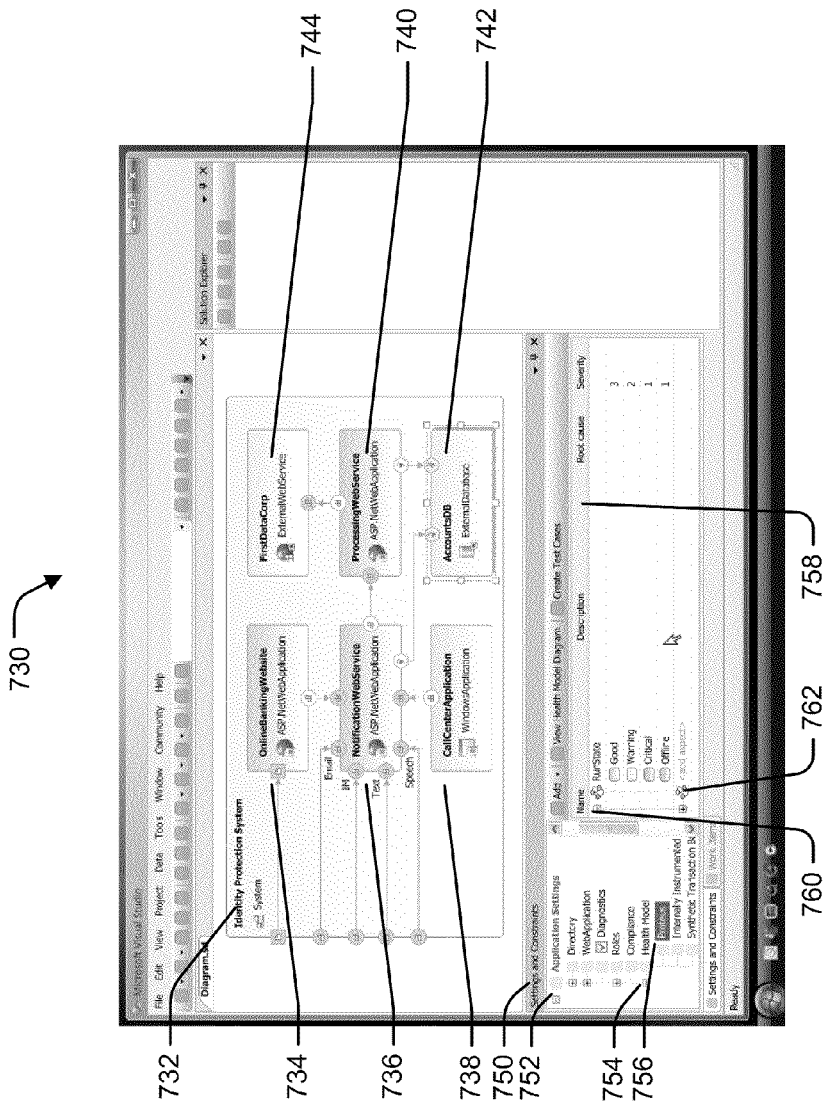

FIG. 7F shows the UI 730 enabling an authoring of health policies. The UI 730 shows a setting window 750 including an tree to author management metadata 752. The user can select the application settings node 752 to open a list of settings associated with a directory, a web application, roles, compliance, health model, etc. The user selects a health node 754 in the setting window 750 to open a tree including details of the health model. The details may include, for example, name of the health model, features of the health model, etc.

As shown in the UI 730, the user selects a model node 756 having a model name, in this example the model name "Proteus" opens a model description area 758. The model description area 758 presents an aspect of the model (i.e., run state). The run state denotes the condition of operation of the modeled component. The model description area 758 includes a run state tab 760 which when selected, displays a set of states that the component can be at all times for this health aspect. The set of states of operation may include, for example, good, warning, critical, and offline. The UI 730 also enables the user to add more aspects using a add aspect node 762.

Figure 7G:
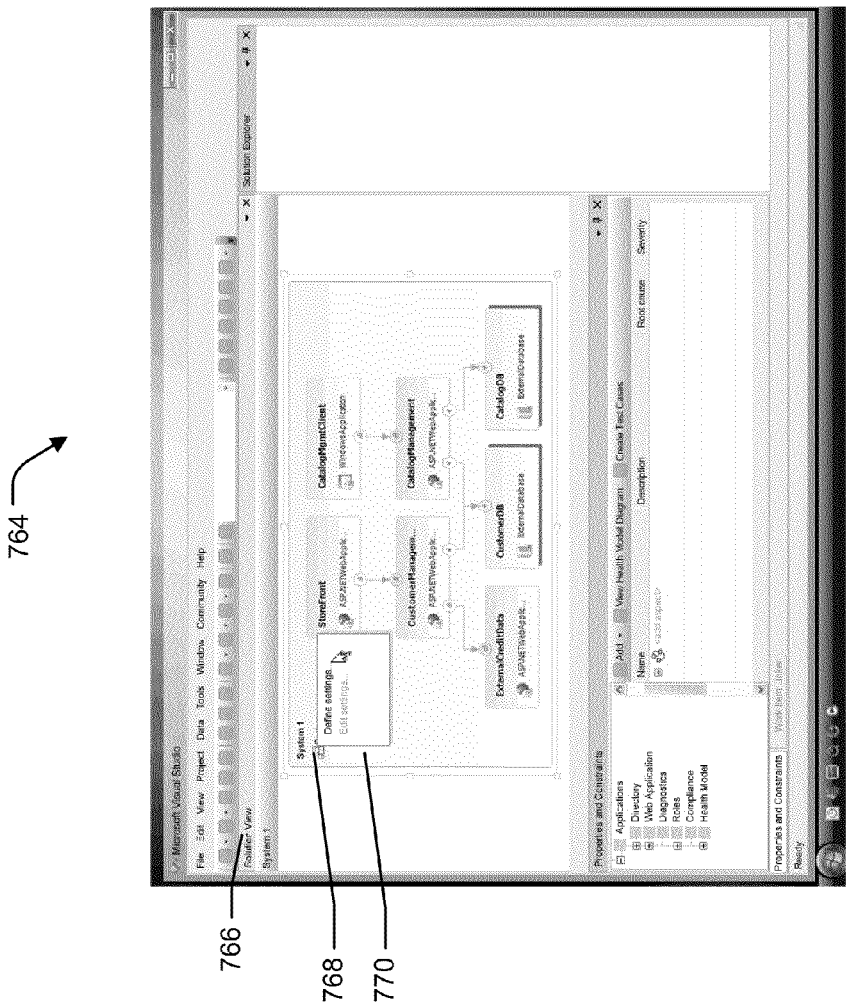

FIG. 7G shows an exemplary user interface (UI) 764 to author configuration policy templates using flows for the same identity protection system. The user selects a system icon 768 present in the solution wizard 766 to open a setting tree 770. The user can select an option, and in this case "define settings" as shown in the setting tree 770. The define settings option enables the user to make changes in the settings of the system.

Figure 7H:
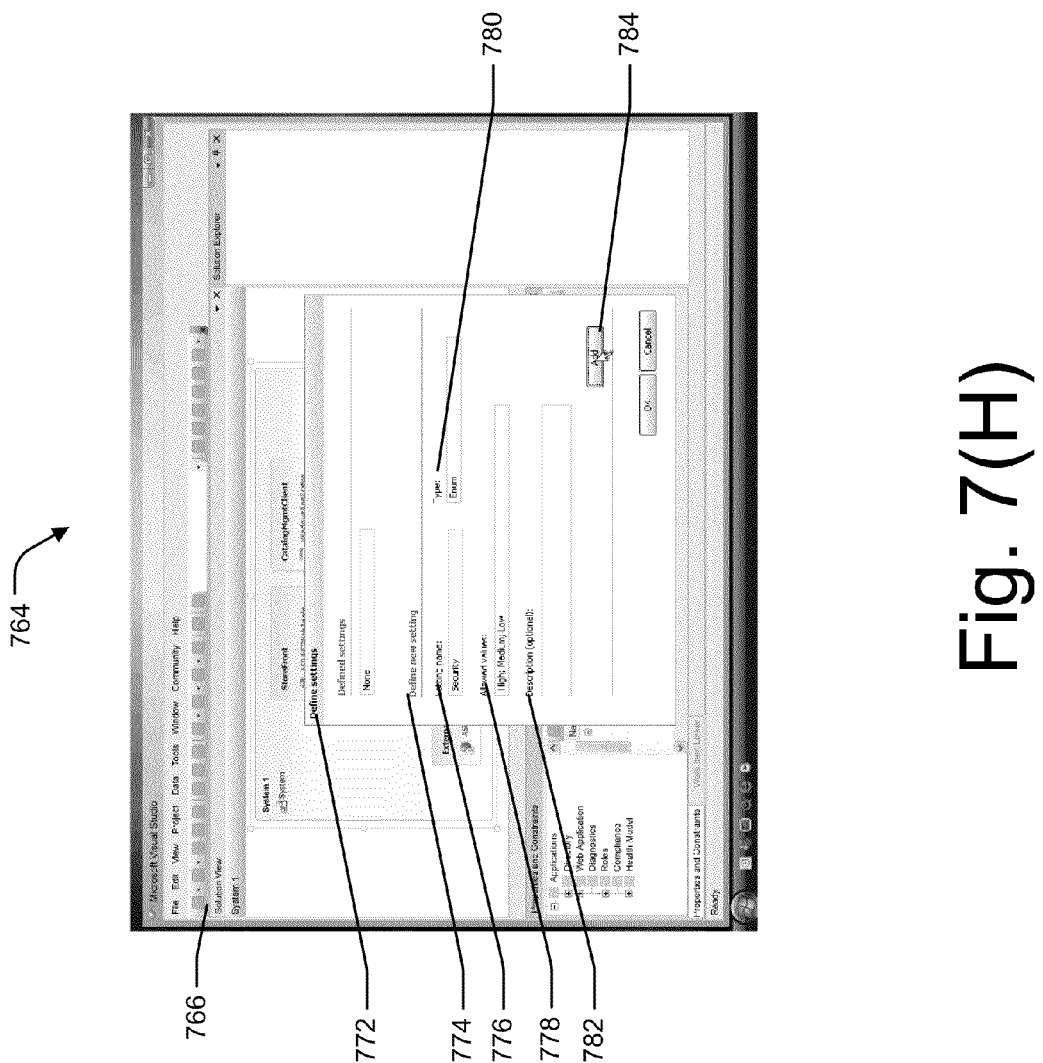

FIG. 7H shows the UI 764 facilitating the user to define new settings. The UI 764 illustrates a setting wizard 772 including a setting defining area 774. The setting defining area 774 includes a name area 776, a value defining area 778, a type defining area 780, a description defining area 782, and a add tab 784. As shown in the UI 764, the user can define a name for the setting like "security" in the name area 776. The value defining area 778 facilitates the user to define allowed values according to the security settings. The allowed values may be high, medium, and low as shown in the UI 764. Further, the user defines the type of the security setting in the type defining area 780. A description of the security setting is included in the description defining area 782. The user can select the add tab 784 to completely define or add the security settings.

Figure 7I:
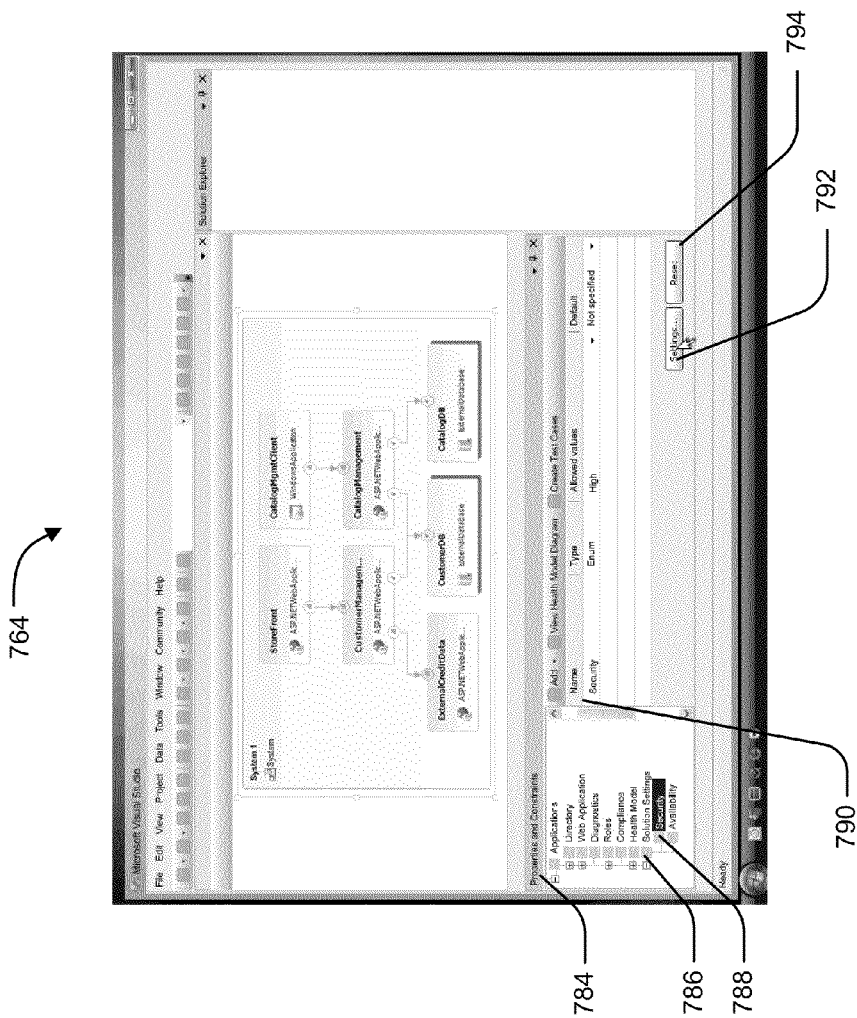

FIG. 7I illustrates the UI 764 having a characteristics defining area 784 including a solution tab 786 that enables the user to define solutions related to security and availability. The user selects a security tab 788 to open a security description area 790. The security description area 790 displays the details of the security setting such as the name of the setting, the type of setting, and the allowed values related to the setting.

Figure 7J:
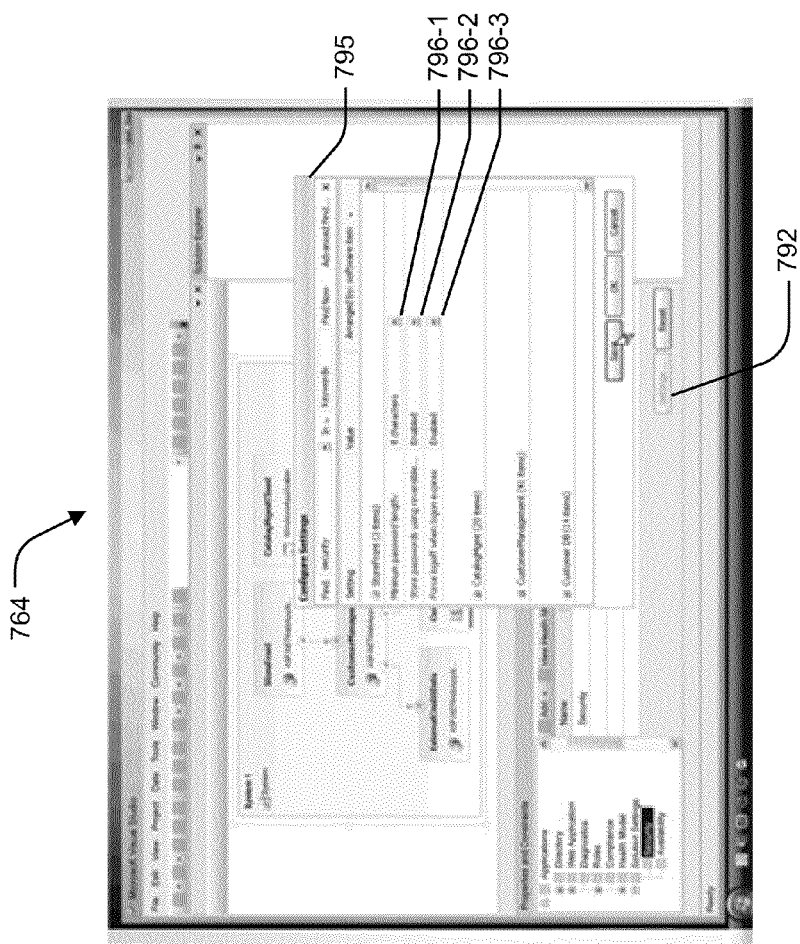

FIG. 7J shows the UI 764 facilitating creation of flows that configure component settings based on the selected settings for the overall composition—in this case for security. The user selects the settings tab 792 to open a configuration wizard 795 providing facilities to set passwords for the security settings. The configuration wizard 795 includes a password length tab 796-1, a store tab 796-2, and a logoff tab 796-3. The password length tab 796-1 enables the user to set a length for the passwords. In one implementation, the password lengths are specific to a particular user for accessing his/her account. For example, the user (e.g. IT administrator) can set a password length as 8 characters. Thus, the particular user can create only passwords having a length of 8 characters.

The user (e.g. IT administrator) can set storing policy related to storing of the passwords. The user clicks on the store tab 796-2 and select an option from two options provided. The options may include enabled and disabled. For example, the user may select the option "enabled" so that the passwords created by the users can be always stored automatically. Further, the logoff tab 796-3 enables the user to set a system to log off on its own when the log on expires, i.e. when the password expires.

Figure 7K:
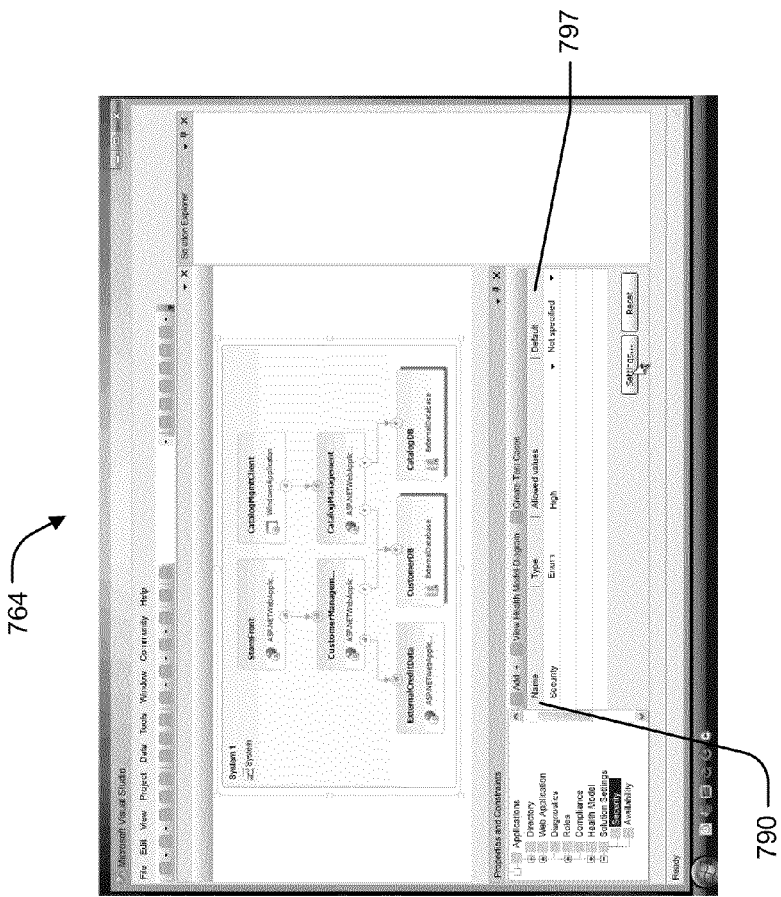

FIG. 7K shows a UI 764 for defining a level of security. The UI 764 includes the security description area 790 showing the details of the security setting. The security description area 790 includes a default tab 797 which, when selected, shows a drop down pick list including various options. The options may include, for example, high, low, and medium. The user can select an option of his choice to set the level of security.

Figure 7L:
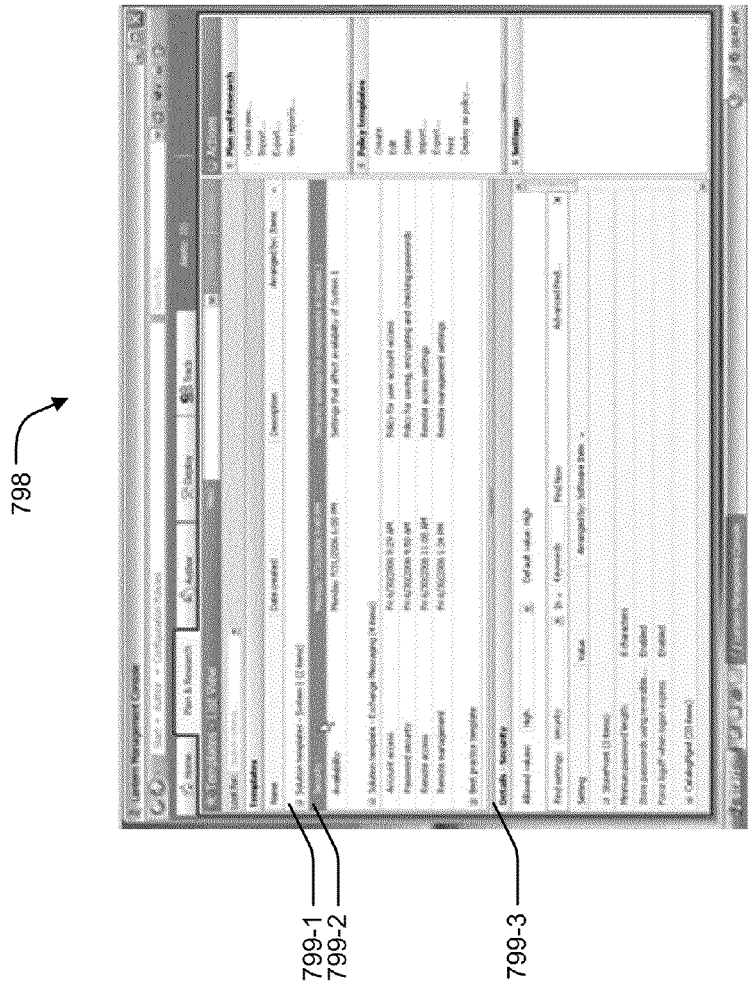

FIG. 7L shows an exemplary user interface (UI) 798 displaying a list of configuration templates that will be part of change templates. The UI 798 includes a solution templates tab 799-1 that displays a list of templates associated with solutions. The templates may include for example, security and availability. The user may select a security template tab 799-2 to display the details of the security template in the security details area 799-3. The security details area 799-3 include information related to security for example, settings associated with password, the allowed values, and the level of security.

Figure 8:
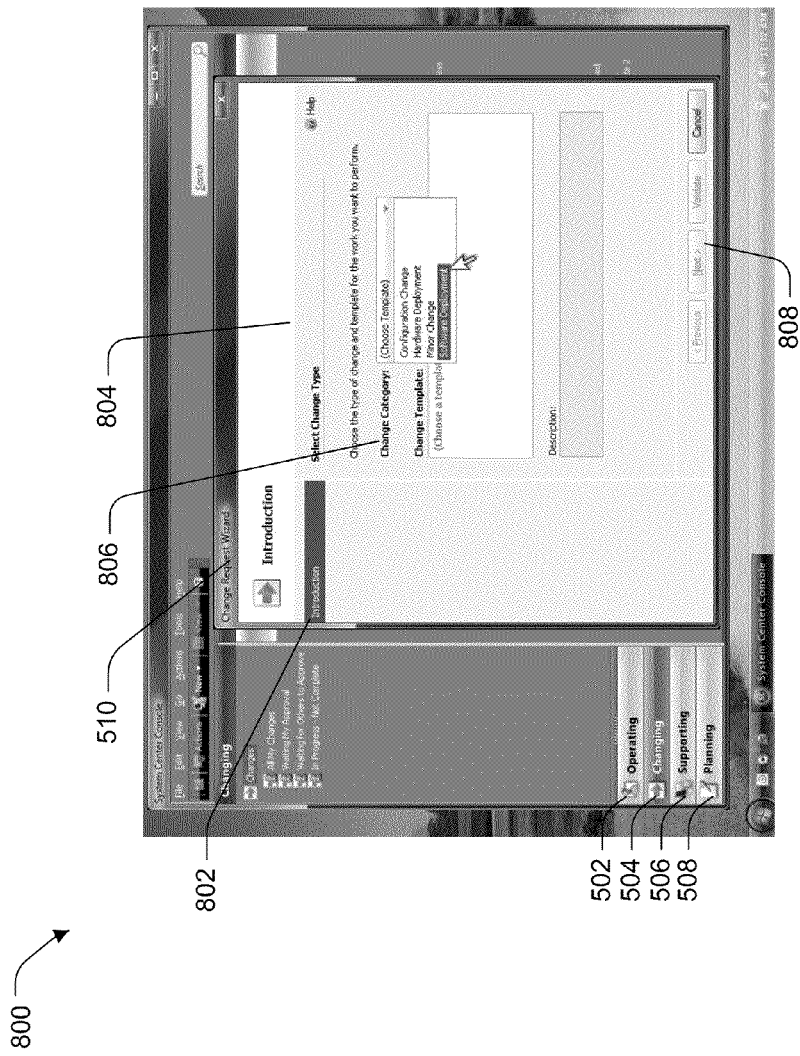
FIG. 8 is an exemplary user interface (UI) that facilitates selection of predefined templates and creation of templates according to user's choice.

FIG. 8 shows an exemplary user interface (UI) 800 that facilitates selection of predefined change templates and creation of change templates according to the user's choice. The UI 800 shows that the user selects an introduction tab 802 in the change request wizard 510 to open a change type selection area 804.

The change type selection area 804 includes a change category tab 806 which when selected by the user, presents a list of the predefined change templates. The list of the predefined change templates may include templates pertaining to configuration changes, hardware deployment, software deployment and other minor changes. The user can select a predefined change template from the list based on the appropriate model. The user can proceed to set other changes through a next tab 808 whenever a predefined change template is selected. Although not illustrated, the UI 800 allows the user to create a new change template based on the requirements of the selected changes.

Figure 9A:
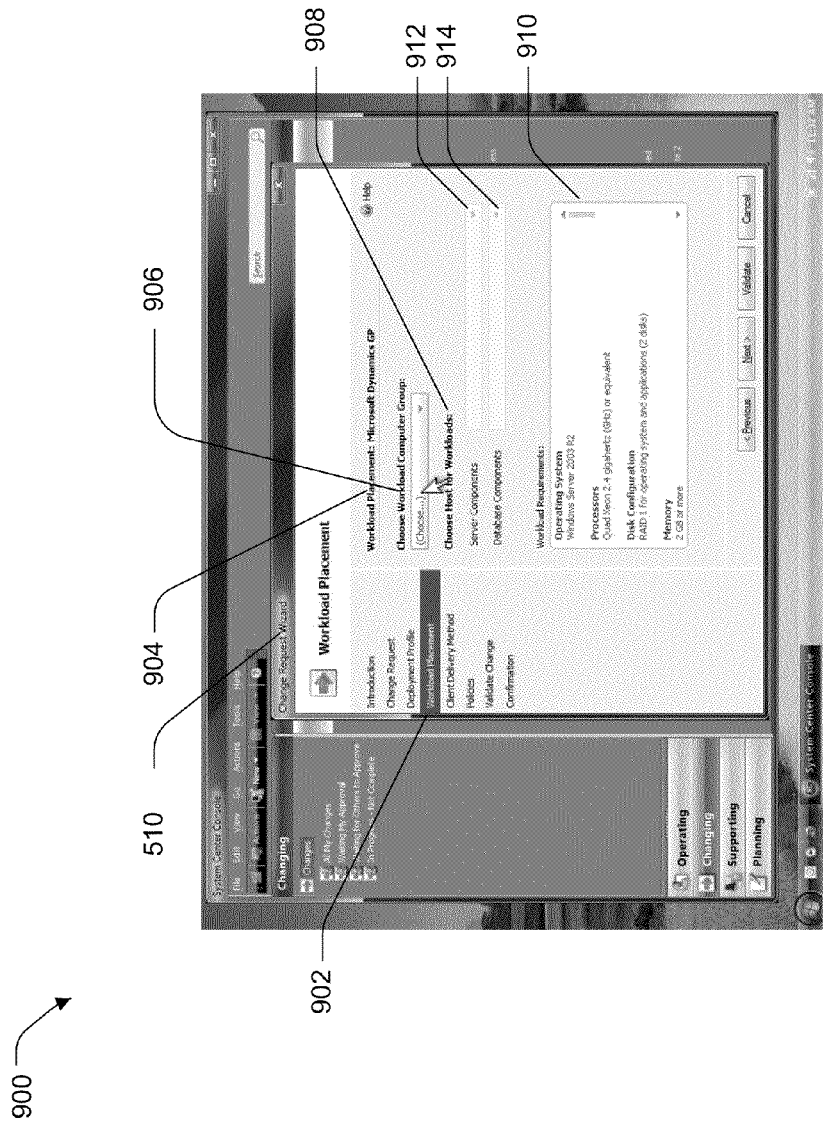
FIGS. 9A, 9B, 9C are exemplary user interfaces (UI) that support configuration of workload placement.

FIG. 9A shows an exemplary user interface (UI) 900 for identifying best fit placement of hardware components and applications in the managed system. The UI 900 gives the user freedom to make choices of placing the hardware components and applications, which shows the UI 900 to be sub-optimal. The UI 900 disallows implementation of unworkable choices based on for business reasons and provides transparency on why a choice was made.

In the UI 900, the change request wizard 510 includes a workload placement tab 902. The user selects the workload placement tab 902 to open a workload placement area 904. The workload placement area 904 facilitates the user to place workload according to his choice. The workload placement area 904 includes a group selection tab 906, a host selection area 908, and a workload description area 910. The group selection tab 906 presents a list of various workload computer groups like groups of different types of servers that can take the workload associated with the appropriate model.

For example, the UI 900 shows a workload placement for the Microsoft® Dynamics® GP software application. The group selection tab 906 may provide a list including various groups of financial servers, manufacturing servers, marketing servers, etc., to the user. The user selects a group that is appropriate for the Microsoft® Dynamics® GP software application.

The host selection area 908 includes a server grading area 912 and a database grading area 914. The host selection area 908 shows the appropriateness of server components and database components in the form of grades. The grades may be assigned based on expected performances of the server components and the database components. This enables the user to determine the places where the server components and the database components can be placed to obtain the best performance. The server grading area 912 provides the grades associated with the performance of the server components. The database grading area 914 presents the grades based on the performance of the database components.

The workload description area 910 provides details of workload requirements for the appropriate model. The workload requirements may include, for example, the type of operating system and processors to be used, the capacity of memory to be installed, and the type of disk configurations to be set.

Figure 9B:
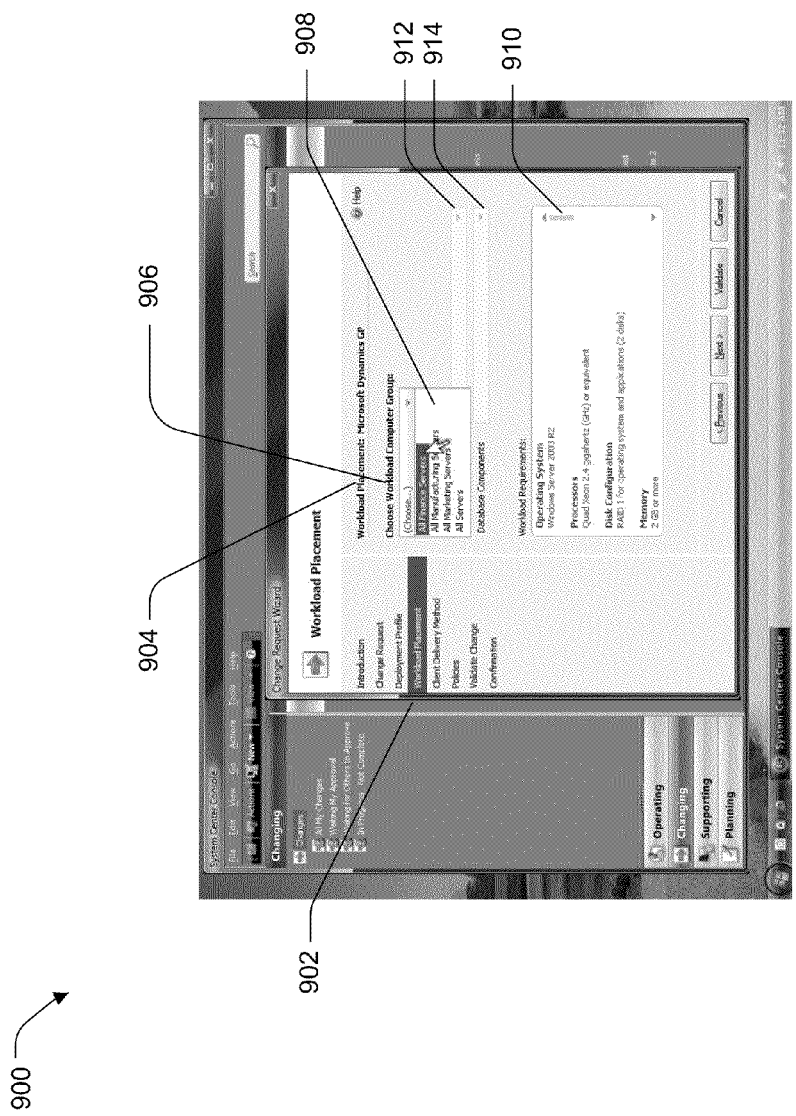

FIG. 9B illustrates the UI 900 for selecting a workload computer group. The user selects the group selection tab 906 for choosing a particular workload computer group. The group selection tab 906 presents the list of various workload computer groups. The user chooses a workload computer group, for example, the group of financial servers, depending on the appropriate model.

Figure 9C:
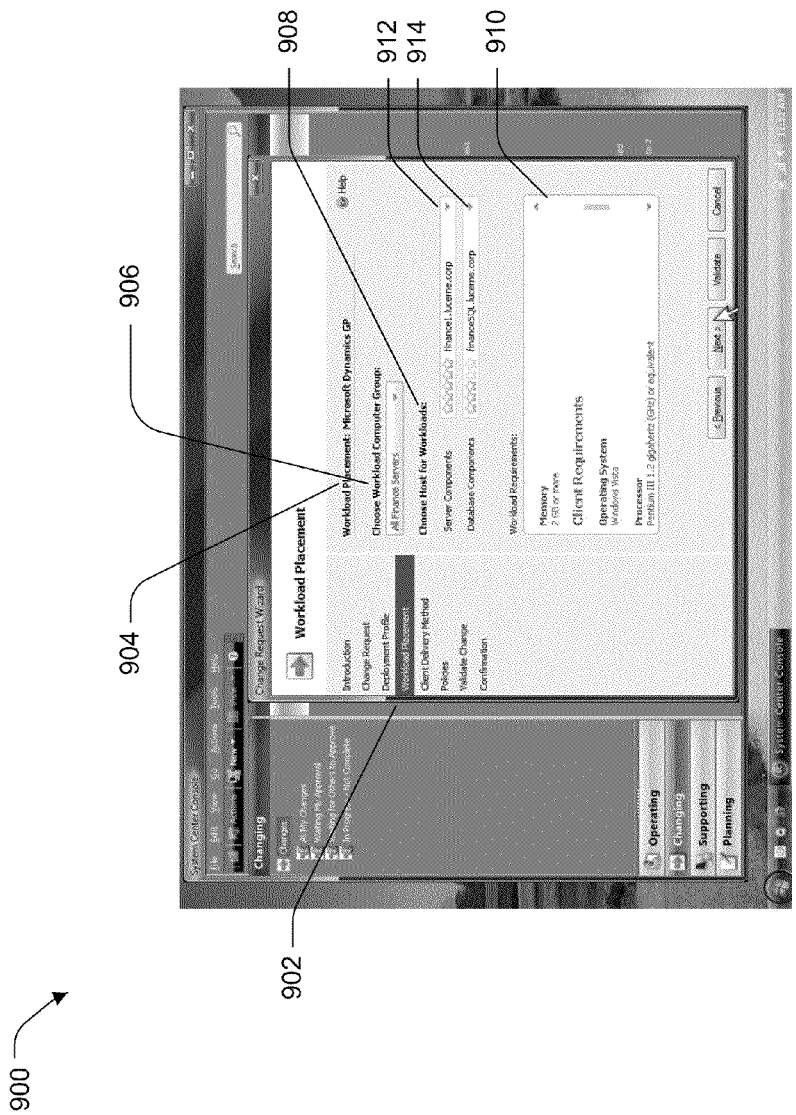

FIG. 9C illustrates the UI 900 showing assigning grades to components of the selected workload computer group. The server grading area 912 and the database grading area 914 provides the grades associated with the performance of the server components and the database components respectively whenever the user selects a workload computer group.

As shown in UI 900, the user selects a workload computer group, in this example the group of finance servers. The server grading area 912 shows five stars for the first set of server components. The five stars imply that the set of server components operating in a particular place according to the appropriate model exhibits a higher performance. The database grading area 914 shows three stars for a set of database components given to the group of finance servers based on their low performance at a particular place of operation. The user can review the grades shown in the UI 900 and can proceed to choose configuration changes to establish the set of database components in a place that where the set of database components can perform better.

In one implementation, the user may prefer to replace the position of the first set of hardware components with the second set of hardware components to assign the second set with a higher grade. The user may perform the above act as he may prefer to allocate the place of higher grade to the second set of server components and assign a different place for the first set of server components.

Figure 10A:
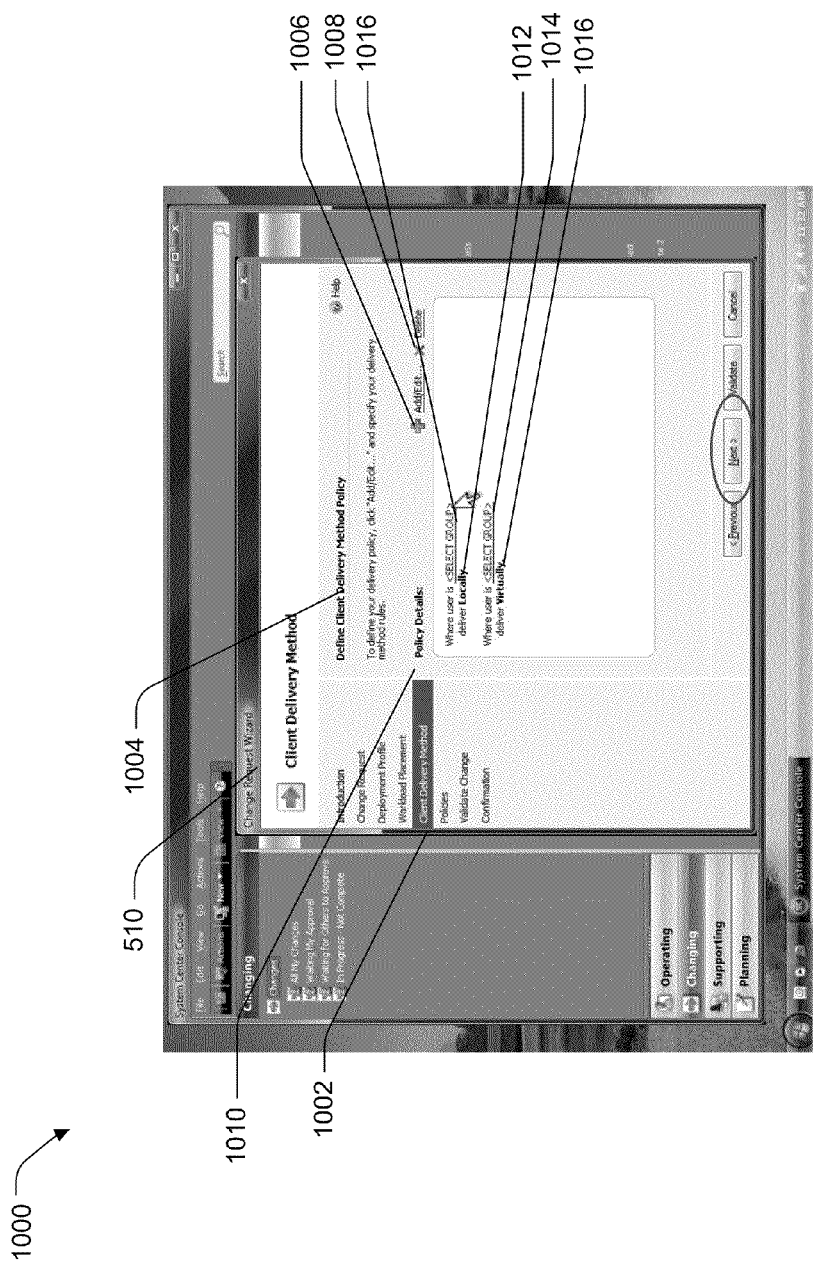
FIGS. 10A, 10B, 10C, 10D are exemplary user interfaces (UI) to support messaging style policy definition configuration.

FIG. 10A is an exemplary user interface (UI) 1000 that supports Microsoft® Outlook® messaging style policy definition for items such as client targeting, deployment mode and scheduling. The UI 1000 shows a change request wizard 510 including a client delivery method tab 1002. The user selects the client delivery method tab 1002 to open a delivery defining area 1004. The delivery defining area 1004 enables the user to define delivery policies related to the delivery of change orders to different types of users in the system 100. The delivery policies may include details of delivery methods and rules.

The delivery defining area 1004 shows the procedure to define the delivery policies. The procedure for defining policy is provided in Microsoft® Outlook® messaging style. For example, the procedure clearly states that to define a delivery method, click "Add/Edit" and specify your delivery method rules". The description of procedure in plain English offers a good user experience to the user. In other words, what is provided is a structured rules editor that results in a plain language (e.g., English) policy statement.

The delivery defining area 1004 includes an add/edit tab 1006, a delete tab 1008, and a policy details area 1010. As shown in the UI 1000, the user uses an add/edit tab 1006 to create the delivery policies. The user can delete the delivery policies using the delete tab 1008. The delivery policies include the delivery methods applicable for the users and a plurality of user groups in which the users may belong. The policy details area 1010 provides two types of delivery methods to the user namely, a local delivery and a virtual delivery.

The policy details area 1010 includes a local delivery area 1012 and a virtual delivery area 1014. The local delivery area 1012 offers user facilities to assign a local delivery of software to a particular user belonging to a particular user group. The user can choose a select group tab 1016 present in the local delivery area 1012 to choose a particular user group from a plurality of user groups. Similarly, the virtual delivery area 1014 enables the user to allot a delivery of a virtualized copy of the application using streaming to a particular user group.

Figure 10B:
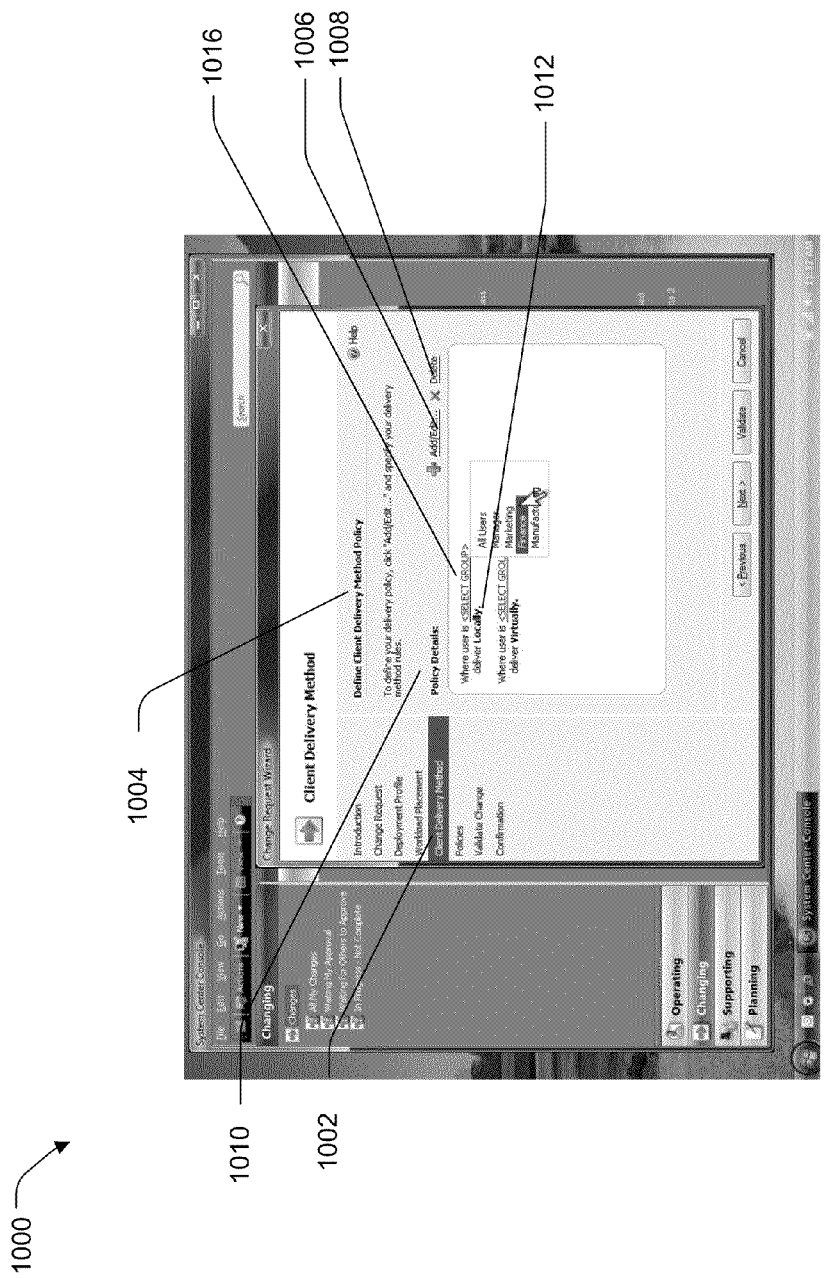

FIG. 10B shows the UI 1000 facilitating the selection of a particular user group provided with a local delivery. In the UI 1000, the user clicks on the select group tab 1016 present in the local delivery area 1012. The select group tab 1016 displays the plurality of user groups. The plurality of user groups may include, for example, all users, manager, marketing, finance, and manufacturing. The user can choose a particular user group of his choice. For example, the UI 1000 illustrates the user selecting a user group as finance and assigning a local delivery of the software for the user group. Thus, a management server(s) 106 locally delivers the software to all the users belonging to the finance user group.

Figure 10C:
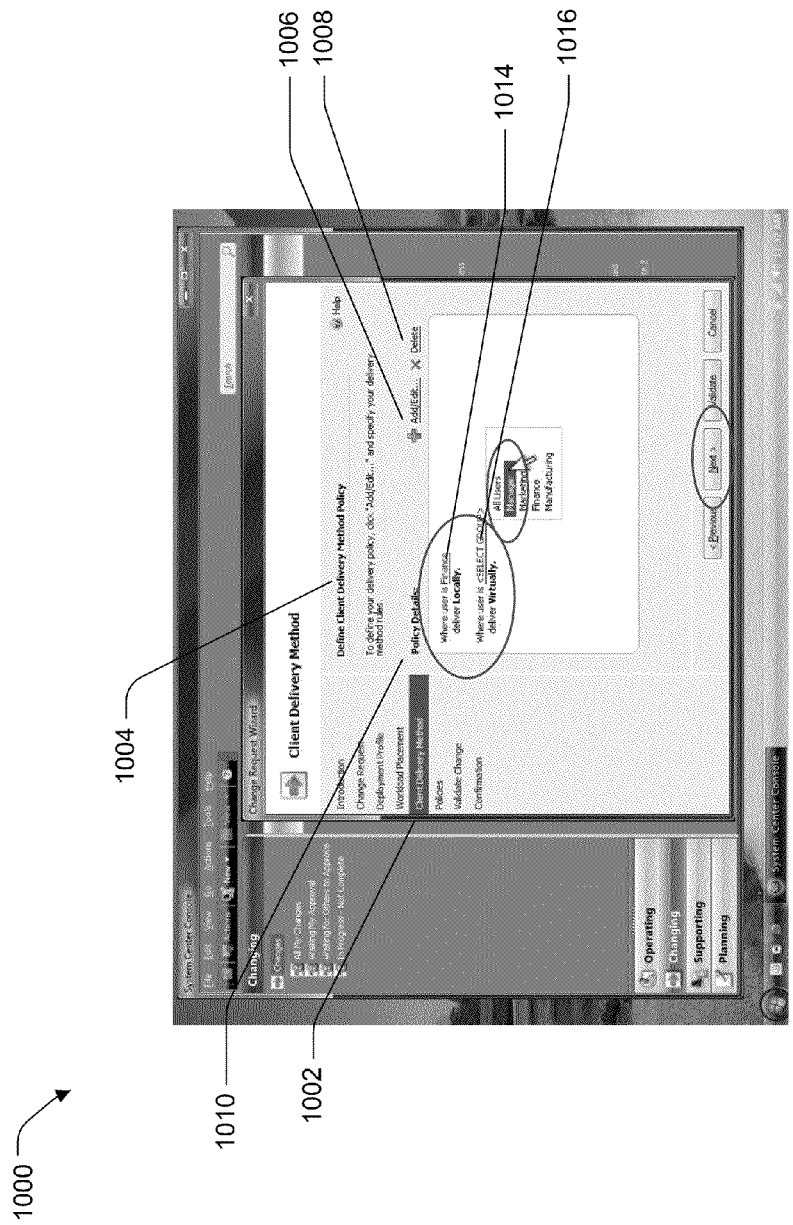

FIG. 10C shows the UI 1000 facilitating a selection of a particular user group provided with a virtual delivery. The UI 1000 shows the user selecting the select group tab 1016 for choosing a user group, i.e., manager. In such a case, the management server(s) 106 virtually delivers the software to all the users belonging to the manager user group.

Figure 10D:
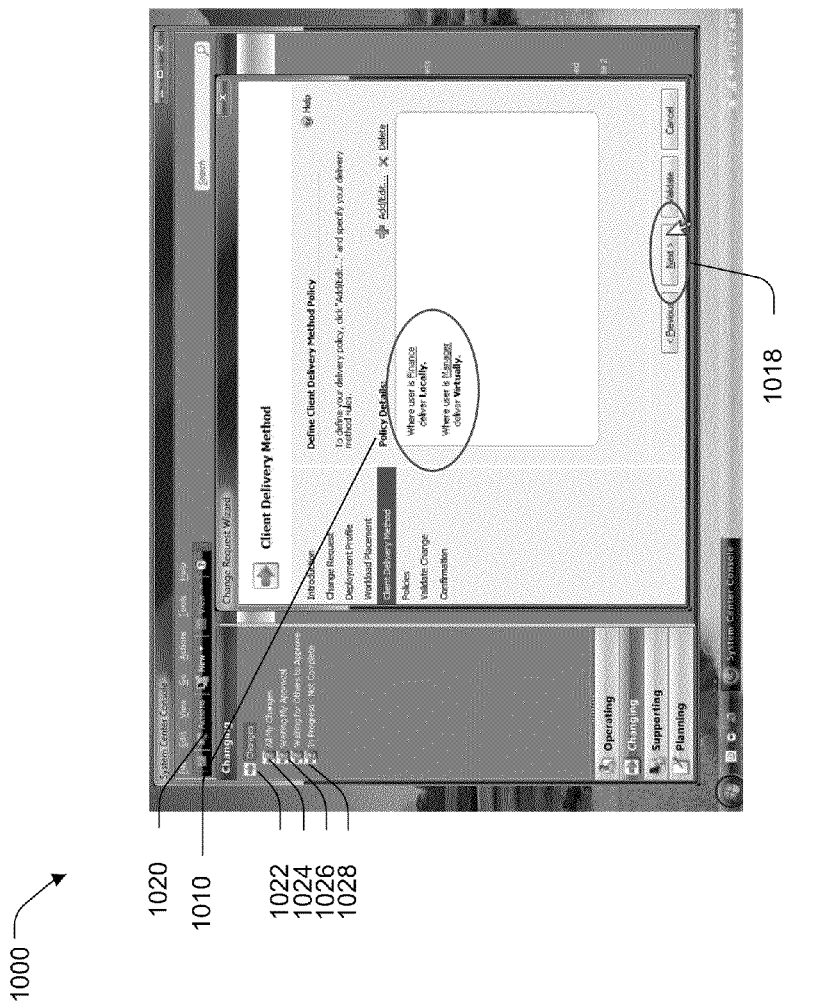

FIG. 10D shows the UI 1000 illustrating a stage of confirming the defined delivery policies. In the present UI 900, the user defines the delivery policies in the delivery defining area 1004 and proceeds to confirm the delivery policies by using a next tab 1018.

Figure 11A:
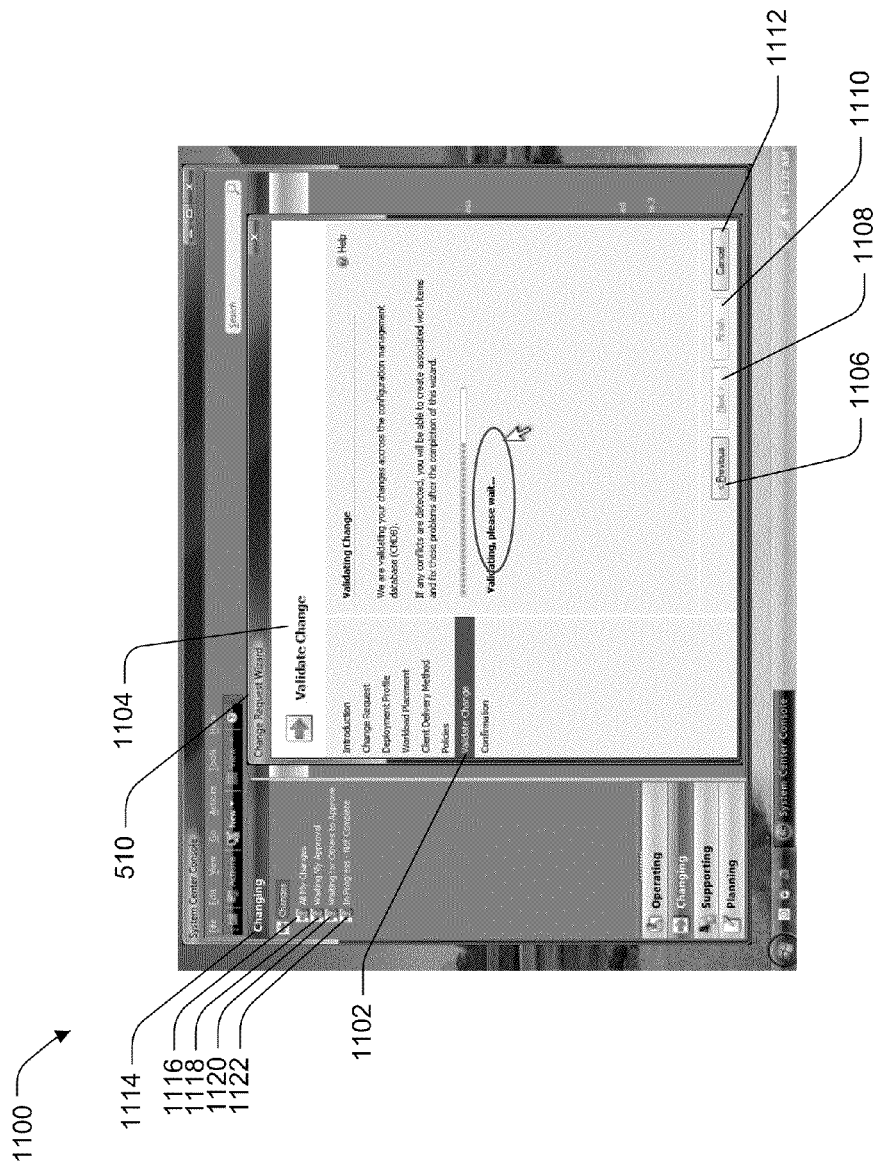
FIGS. 11A, 11B, 11C are exemplary user interfaces (UI) to support validation.

FIG. 11A shows an exemplary user interface (UI) 1100 for validating a change order associated with the selected changes that may be implemented. As mentioned previously, a change order is defined initially and an extensible validation system allows plugging of validators from any discipline to validate the change order. For instance, a cost validator can look up the cost of each component in the change order and total up the cost of material and time and make sure it is within the constraints as defined in the CMDB 322.

The UI 1100 illustrates the user selecting a validation change tab 1102 in the change request wizard 510 to open a validation change wizard 1104. The validation change wizard 1104 includes a previous tab 1106, a next tab 1108, a finish tab 1110, and a cancel tab 1112. The previous tab 1106 enables the user to move to any of the previously mentioned wizards for redefining the changes.

The user selects the next tab 1108 to start a validation process for validating the defined changes. The validation change wizard 1104 shows status of the validation process as "validating please wait" until the validation process is complete. The validation process involves comparison of the defined changes with the pictures of the deployed model (i.e., appropriate model) present in the CMDB 322.

The validation change wizard 1104 generates warnings for policy conflicts that may be detected. If policy conflicts are not detected, the validation change wizard 1104 provides the finish tab 1110 to proceed to the next step. The validation change wizard 1004 also provides the user an option to cancel the validation process by clicking the cancel tab 1112.

The UI 1100 also includes a changing wizard 1114 facilitating the user to define settings for approval of the selected changes according to one embodiment. The changing wizard 1114 has a my changes tab 1116, a waiting approval tab 1118, an others approval tab 1120, and a progress tab 1122. The user can activate the my changes tab 1116 to view any changes selected by the user out of the selected changes. The selected changes made need to be approved by the user and other authorized people.

The waiting approval tab 1118 can be selected to check whether the changes have been approved by the user. The user can also select the others approval tab 1120 to check whether the authorized people have approved the selected changes. The rate of completion an approval process (i.e., approval of the selected changes) is displayed upon clicking the progress tab 1122. The rate of completion is displayed in a form of percentage of completion.

Figure 11B:
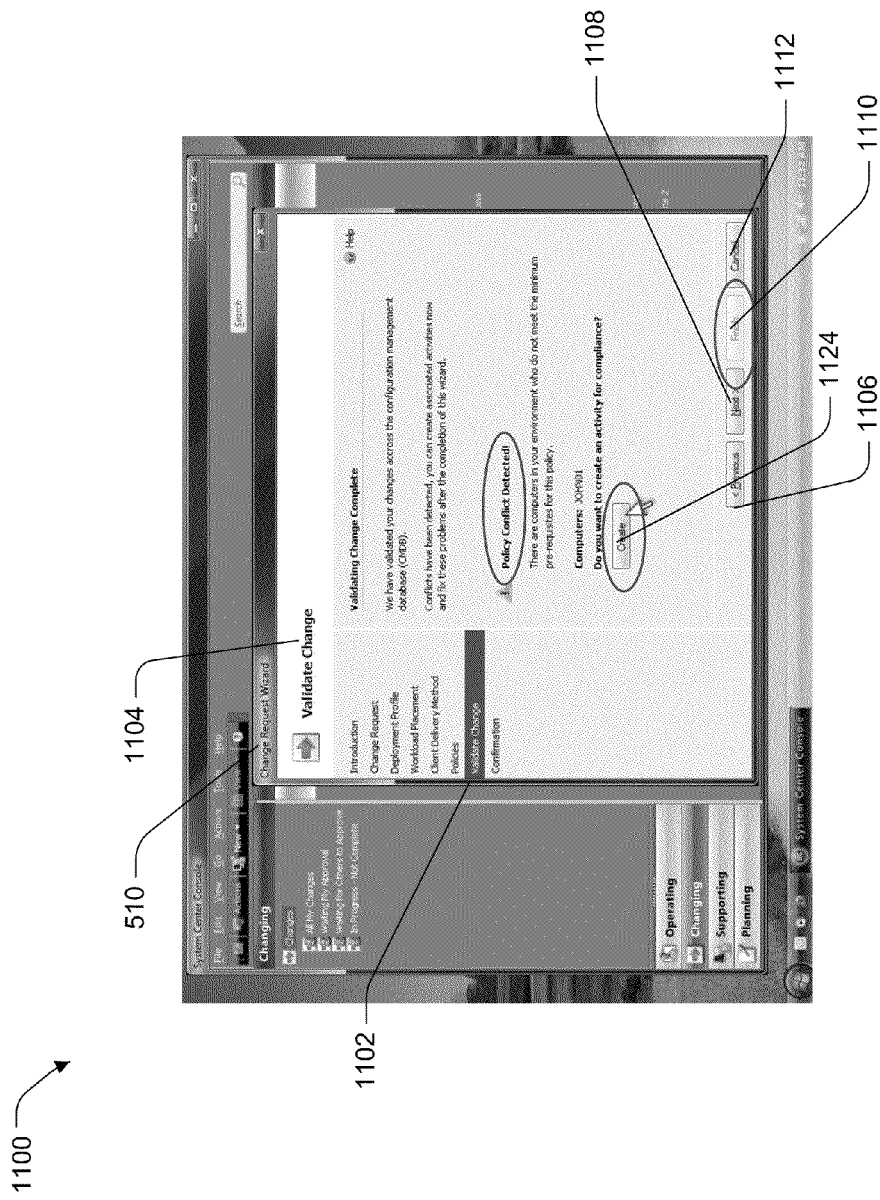

FIG. 11B shows the UI 1100 generating warnings for any policy conflicts detected. The UI 1100 includes the validation change wizard 1104 showing the results of validation of the selected changes through the CMDB 322. The results as mentioned in the UI 1100 states that the selected changes have been validated through the CMDB 322 and a policy conflict has been detected. The UI 1100 instructs the user to create activities that can fix the conflicts once the validation change wizard 1104 is complete.

The validation change wizard 1104 includes a conflict details area 1006 that provides details of the policy conflict to the user. The details may include reasons for generation of the policy conflict for example, the policy conflict aroused because few computers did not meet the minimum pre-requisites for the policy. The validation change wizard 1104 also provides the identification number of the computers having the policy conflict and asks for creation of an activity for fixing the policy conflict. The user can select a create tab 1124 to create the activity.

Figure 11C:
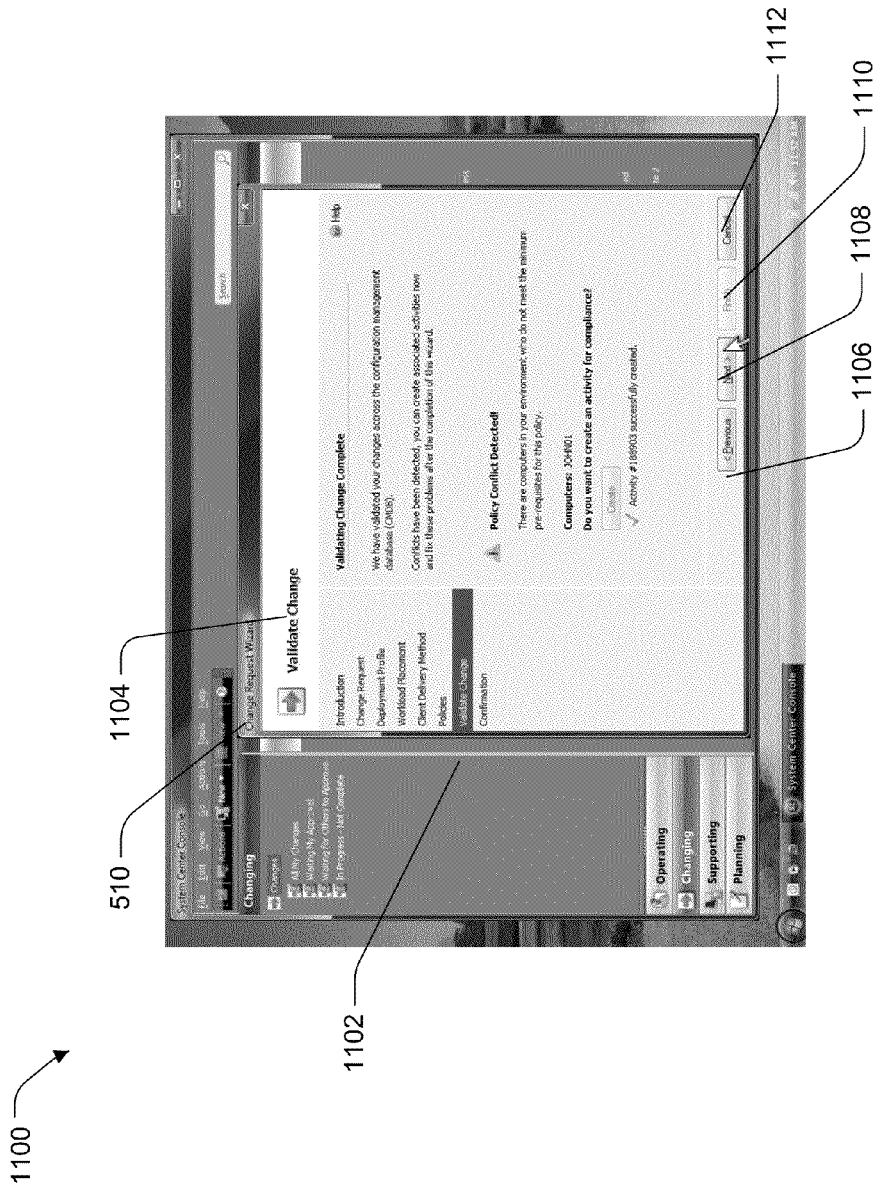

FIG. 11C shows the UI 1100 facilitating a creation of activity for fixing the policy conflicts. The validation change wizard 1104 in the UI 1104 shows a confirmation message stating that the activity has been successfully created. The confirmation message also includes an activity number for the activity. The user can select a next tab 1108 to move to a next step for confirming the selected changes subsequent to the completion of the activity.

Figure 12:
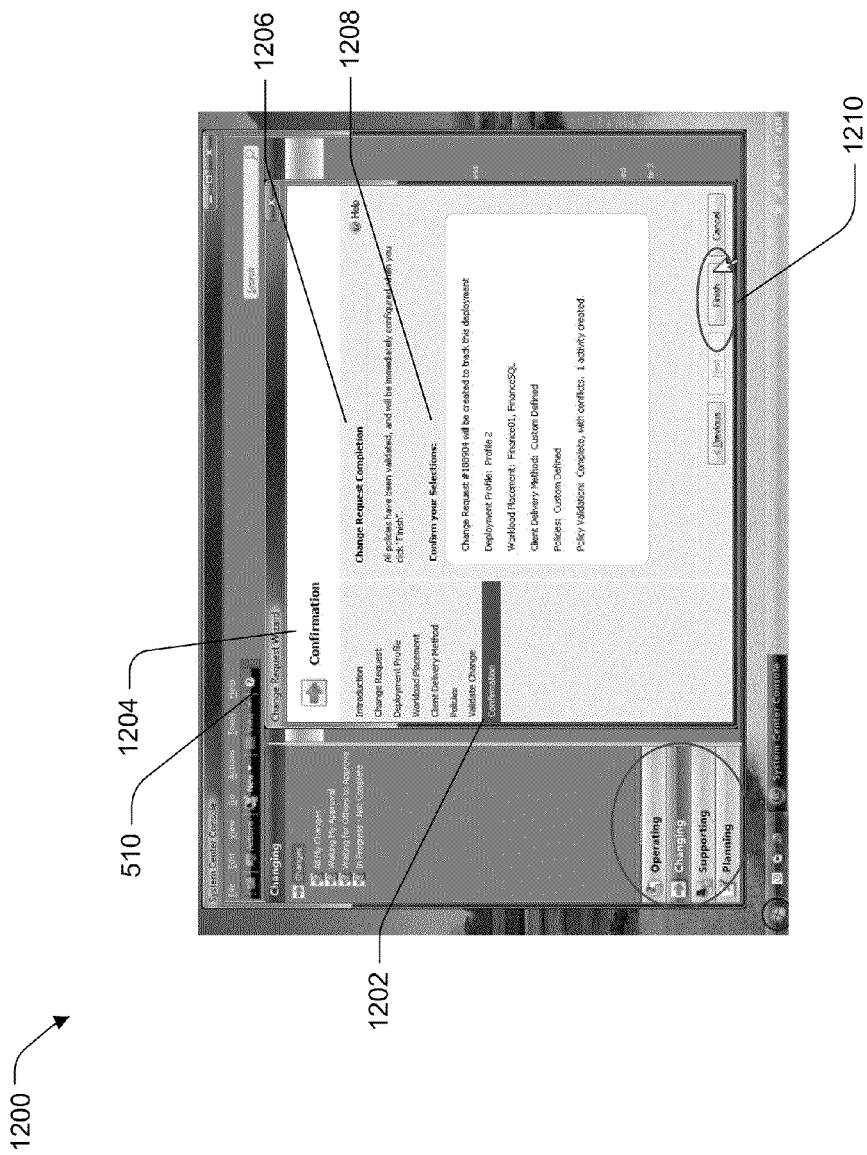
FIG. 12 is an exemplary user interface (UI) which facilitates implementation of managerial changes.

FIG. 12 illustrates an exemplary user interface (UI) 1200 confirming the selected changes. As shown in UI 1200, the user selects a confirmation tab 1202 in the change request wizard 510 to open a confirmation wizard 1204. The confirmation wizard 1204 includes a completion details area 1206 and a confirm selection area 1208. The completion details area 1206 shows a message stating that the selected changes have been validated and the selected changes will be implemented when the user selects a finish tab 1210.

The confirm selection area 1208 includes details of the selected changes that must be confirmed by the user prior to implementation. The details of the selected changes may include, for example, a message stating that a change request number for a change request for the selected changes will be created to track the deployment of the selected changes, type of deployment profile selected, type of workload placement selected, type of client delivery method selected, type of policies selected, and status of policy validation. The user can confirm the details of the selected changes and select the finish tab 1110 to deploy the selected changes.

Figure 13:
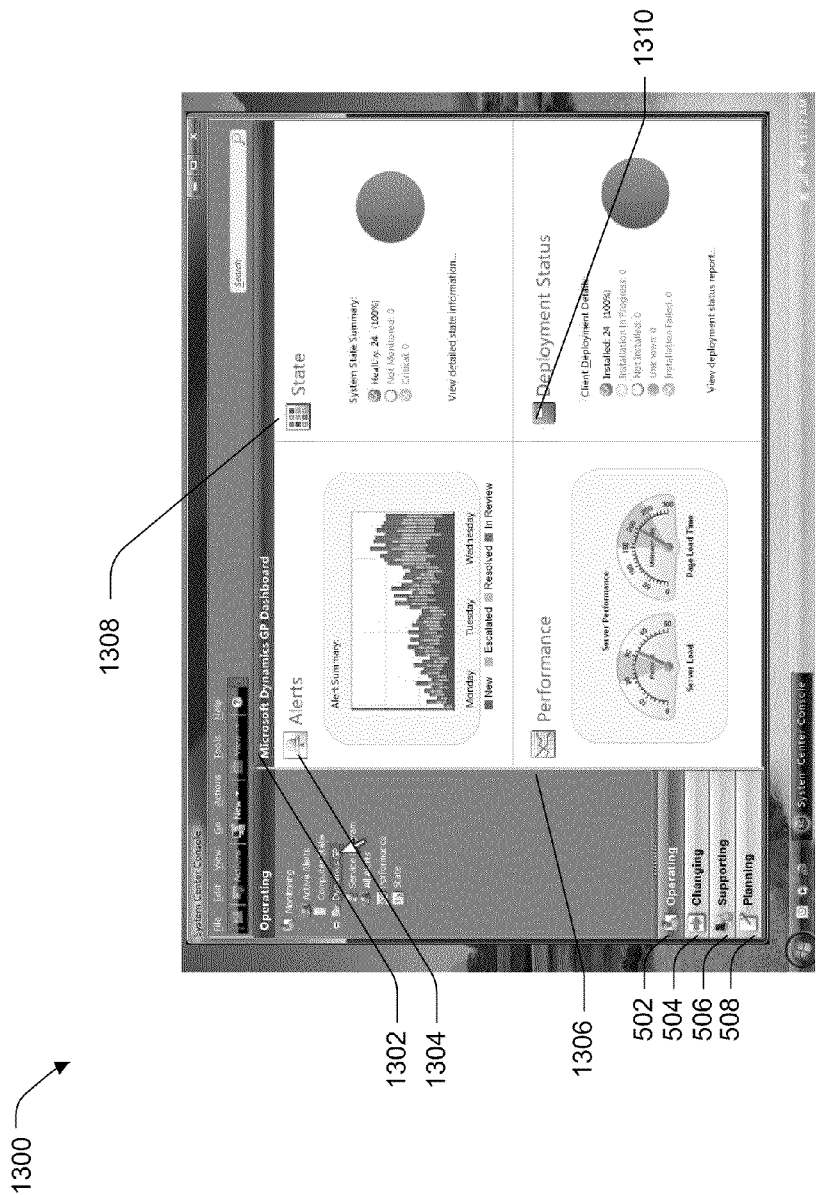
FIG. 13 is an exemplary user interface (UI) that facilitates observation of an information technology monitoring system.

FIG. 13 illustrates an exemplary user interface (UI) 1300 that facilitates observation of the monitoring system and presentation of a status of the monitored environment. In this illustration, the operating tab 502 is triggered to display an operating wizard 1302 to the user. The operating wizard 1302 includes an alerts area 1304, a performance area 1306, a state area 1308, and a deployment status area 1310. The configuration reviewing module 312 displays the details regarding the status of the software applications and hardware components received from unifying agents 110 in the above-mentioned areas.

The alerts area 1304 depicts a graphical representation of the status of the alert signals received by the management server(s) 106. The graphical representation provides information of the number of alerts received on each day, the number of alerts that have escalated for the past few days (i.e. not resolved till now), the number of alerts resolved, and the number of alerts under review. Such graphical representation enables the management server(s) 106 to monitor the working of the system 100 and to take necessary actions for any faults in the system 100. In one implementation, management server(s) 106 may automatically send a message to the concerned person for fixing the faults when the alert signals associated with the faults are escalated for the past few days.

The performance area 1306 displays the performance of the management server(s) 106. In the illustrated example, the performance area 1306 depicts a percentage of server load and load time. Thus the management server(s) 106 can configure on its own to reduce the load and to increase the efficiency. The state of the managed nodes 104 in the system 100 is displayed in a form of percentage of health in the state area 1308.

The deployment status area 1310 provides deployment details of the selected changes to the user. The deployment status area 1310 also shows whether the selected changes have been implemented or is in the progress of implementation or not implemented or unknown or implementation failed. These deployment details assist the management server(s) 106 to check whether the selected changes are implemented or not implemented due to any failures that have occurred.

Exemplary Architecture

Figure 14:
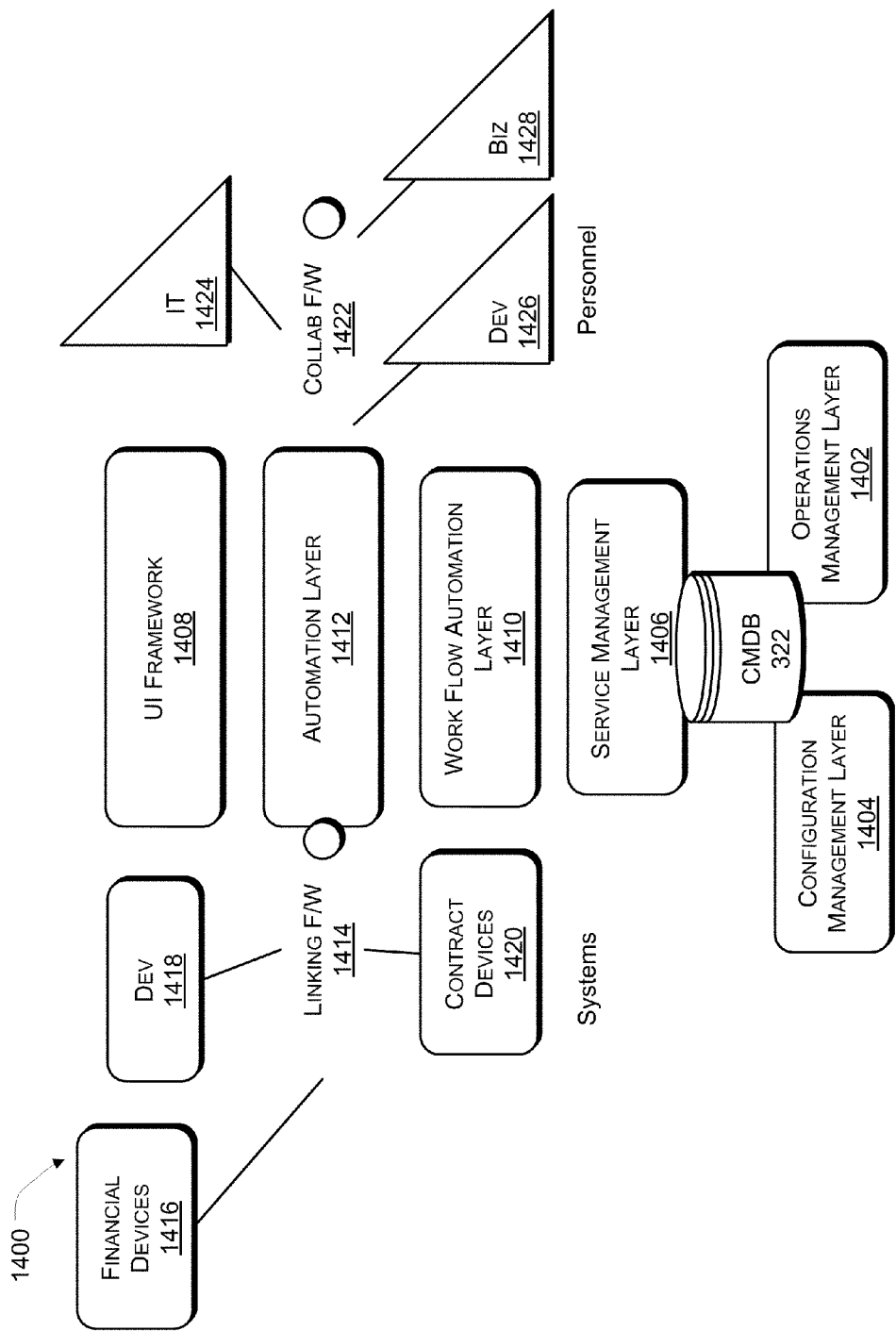
FIG. 14 is a block diagram of an example architecture overview.

FIG. 14 shows an exemplary architecture overview 1400 of the management system 100. The architecture overview 1400 mainly includes three layers having a common CMDB 322: an operations management layer 1402, a configuration management layer 1404, and a service management layer 1406. The operations management layer 1402 and the configuration management layer 1404 operate individually; however, they continuously interact with the CMDB 322. The service management layer 1406 provides a service view to the managed nodes 104, based on various models stored in the CMDB 322. The interactions between the operations management layer 1402, the configuration management layer 1404, and the service management layer 1406 are automatically controlled by a work flow automation layer 1410.

The operations management layer 1402 may be configured to monitor the performance of the software applications and hardware components in the management system 100 and to identify faults, health, and other problems of the management system 100. The operation management layer 1402 sends information pertaining to performance, faults, health, etc., to the CMDB.

The work flow automation layer 1404 decides on managerial changes based on the performance, faults, health and other problems or new business needs. As mentioned previously, the managerial changes may also be selected by the user and may include deploying software applications and hardware components, and altering connections between the various computing devices in the management system 100.

The work flow automation layer 1404 interacts with a user interface (UI) framework layer 1408 to provide the user with user interfaces for providing facilities to select the managerial changes. The user creates change orders for the selected changes. The configuration management layer 1404 validates the change orders by identifying whether the selected changes are within predefined constraints stored in the CMDB 322. The predefined constraints may be cost constraints, policy constraints, capacity constraints, SLA constraints, etc. The configuration management layer 1404 implements the selected changes based on validated change orders.

The configuration management layer 1404 interacts with an automation layer 1412 to implement the selected changes. The interaction includes sending the change orders and the selected changes to the automation layer 1412. The unified management system is used by an IT service management team. However, the work flow process of creating changes, approving them, synchronizing data or reporting status includes other professionals using other systems or tools. The automation layer provides a linking framework to synchronize work flows and data with other systems like HR systems, financial systems etc. This would allow situations where the change order when a new employee starts to be automated. Similarly the automation system also provides connectivity to a collaboration framework (e.g., Microsoft® Office® server) to enable other professionals to get assigned tasks for reviewing reports, providing approvals, filling out forms, etc.

The automation layer 1412 receives the selected changes pertaining to any changes to be implemented in the systems and the personnel devices. The automation layer 1412 acts as an intermediate layer to carry instructions of the configuration management layer 1404 to implement the selected changes.

Example Architecture

Figure 15:
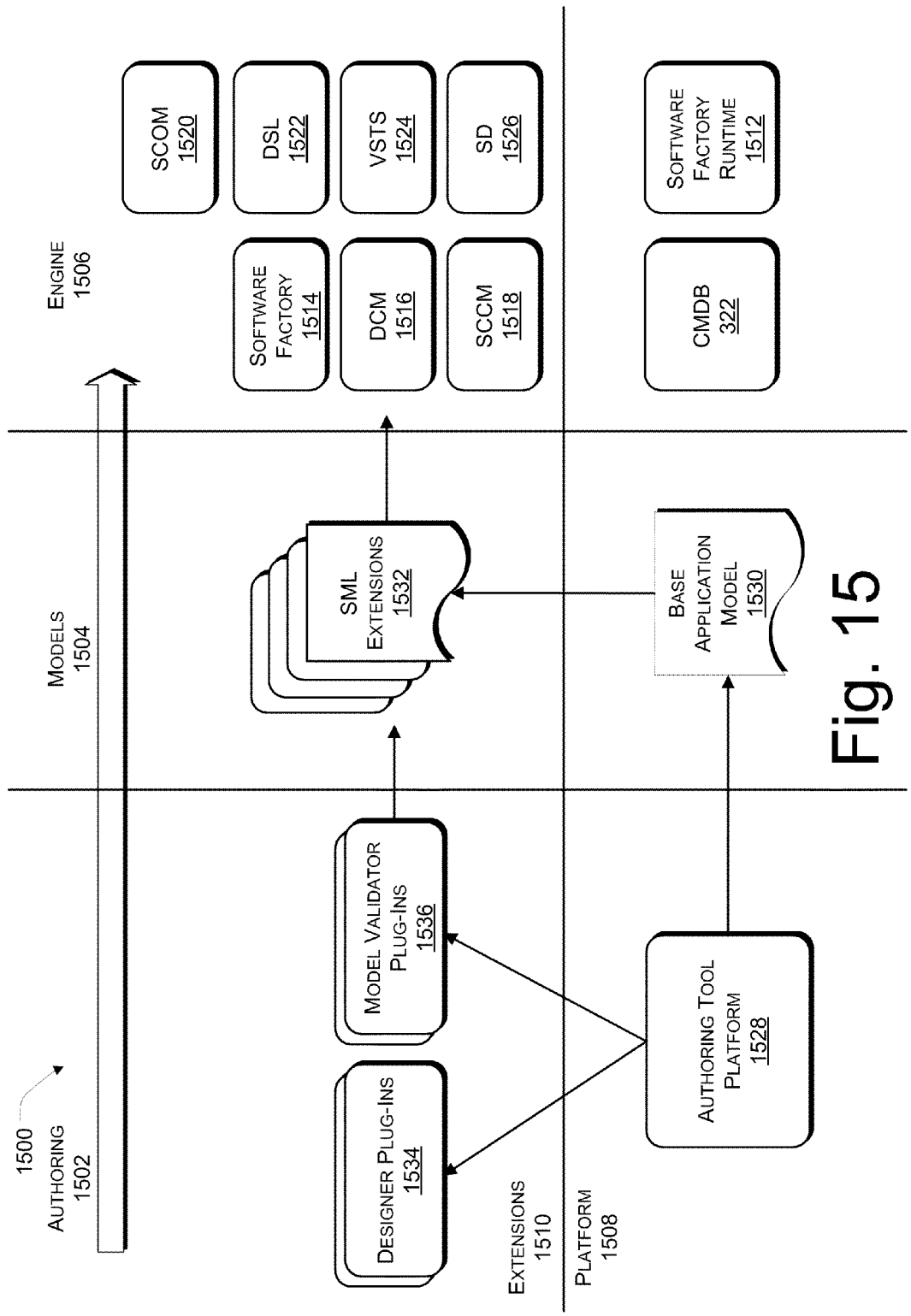
FIG. 15 is an illustration of an overall architecture that supports unified service management.

FIG. 15 illustrates an overall information flow 1500 that supports unified service management. The architecture overview 1500 may be interpreted as information flow. The architecture 1500 introduces the idea of model based development and model based management. In other words, a developer or architect may first lay out the model(s), the models guide and validate the development and test process. After development, all phases of the application life cycle—planning, validation, change management, deployment and operations are also accomplished by leveraging the same models.

The architecture 1500 includes three sections namely authoring 1502, models 1504, and engine 1506. Each section is divided into two parts, and in particular platform 1508 and extensions 1510.

The authoring 1502 section enables the user to author or create models and validate software application documents created in reference to the models. For example, the unified console 110 facilitates the user to design models. The models 1504 section include model documents created by the user using modeling tools present in the authoring 1502. The model documents are then utilized by the engine 1506 section. The engine 1506 includes users like CMDB 322, a software factory run time 1512, a software factory 1514, Desired Configuration Management subsystem (DCM) 1516, a System Center Configuration Management (SCCM) 1518, a System Center Operations Manager (SCOM) 1520, a Definitive Software Library (DSL) 1522, a Visual Studio Team System (VSTS) 1524, and a System Center Service Manager (SCSM) 1526.

Users of the model documents may be of two types. For one type, there may be users that may act as a platform for developing software applications in compliance with the models. For example, the user may write codes for developing software applications in compliance with the models to apply a right configuration and instrumentation in the codes. Such process of developing software applications may use the software factory run time 1512 as a platform. For another type, there may be users that may review and understand the constraints specified in the model documents. For example, users may be management products that can review a model and understand that the model relates to a three tier application, and the application includes different parts that may be placed on different machines.

As discussed above, the sections of information flow 1500 may be split into two parts: platform 1508 and extensions 1510. The platform 1508 of the authoring 1502 includes an authoring platform 1528 capable of authoring a base application model 1530 based on the inputs from the user. The base application model 1530 may include, a description of a software application, for example, a 3 tier application includes a particular web service, a web server, a database and so forth. The base application model 1530 is generated in a form of service management language (SML) documents.

A copy of the base application model 1530 may be stored in the CMDB 322. Copies of instances of the software applications referred in the base application model 1530 may also be stored in the CMDB 322. The copy of the base application model 1530 may be reviewed by the software factory run time 1512 to identify the codes and deduce relationship between the codes and components of the software application.

The extensions 1510 may include extensions of the base application model 1530 i.e. domain specific models or SML extensions 1532. The SML extensions may be, for example, health models, process models, configuration models, and/or best practices models, etc. The SML extensions 1532 are created by the authoring platform 1528. The SML extensions 1532 may refer to the base application model 1530, but may include few operations different from the base application model 1530. The authoring platform 1528 may provide domain specific plug-ins including designer plug-ins 1534 and model validator plug-ins 1536. The designer plug-ins 1534 may design the SML extensions 1532, whereas the model validator plug-ins 1536 validates the SML extensions 1532 to identify whether it meets the performance needs, the policy needs, etc. The SML extensions 1532 may be utilized by the users (i.e. software applications) for supporting test activities.

Exemplary Method

Exemplary methods for unified service management from the view of the Versatalist are described with reference to FIGS. 1 to 15. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

FIG. 16 illustrates an exemplary method 1600 for managing a network using a unified methodology. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1602, changes to be implemented are identified. A user, such as an IT administrator, reviews the status of the software applications and hardware components to decide on the changes to be implemented in the management system 100. For example, the user identifies the identified changes based on the status of software applications and hardware components including performance, heath information, faults, etc. The identified changes may include installation of new software applications and hardware components, changing health policies of the hardware components, and changing data protection policies of the new software applications as mentioned previously.

At block 1604, an appropriate model associated with the identified changes to be implemented in a network is selected. In one implementation, the user reviews a list of models depicting various different configurations of other networks, and software applications, and hardware components provided by a user interface. The user identifies the appropriate model from the list based on the identified changes. In one implementation, the appropriate model is identified based on the responses given by the user to the queries displayed in the user interface.

At block 1606, a deployment profile associated with the appropriate model is selected. The user may select the deployment profile from a list of profiles associated with the appropriate model. For example, a user interface may provide a list of profiles suitable for the appropriate model to the user. The user reviews the set of criteria associated with each profile and identifies the appropriate model having an acceptable set of criteria.

At block 1608, administration policies associated with the deployment profile is configured. In one implementation, user reviews and decides the administration policies including health policies, network policies, and protection and recovery policies, according to the constraints defined in the deployment profile. The constraints may include the usage of certain software applications, processors, and/or disk configurations.

At block 1610, a change template is chosen based on the selected deployment profile. In an implementation, the selection may be done by choosing the change template from a group of predefined change templates. The change templates may be associated with a configuration change, a hardware deployment, a minor change, and/or a software deployment. The unified console 110 of the management server(s) 106 provides the group of predefined change templates to the user. The user identifies the requirements of the identified changes and selects a change template. In one implementation, the required change template is created by the user using the unified console 110.

At block 1612, change order instances are created from the selected change template. The change order instances for most common changes may be created based on the set of questions included in the selected change template which are to be addressed by the user. The change order instances represent the work flow that needs to be followed to implement the desired change as mentioned previously. In an implementation, the user may be provided with facilities to create new change templates.

At block 1614, the change order instances are validated prior to implementation of the identified changes. The change orders are validated by validation module 404 using validators from various discipline such as cost validators, policy checkers, capacity checkers, SLA checkers, etc. The validators can verify whether the selected changes are feasible based on constraints like cost, policy compliances, etc. The change order instances are declared valid when the identified changes are found feasible.

For example, a cost validator can review a selected model to estimate the cost of software applications and hardware components required according to the changes and the total cost of the resources used and the time consumed. The estimated cost is compared with predefined constraints to validate the changes.

At block 1616, the identified changes are then implemented based on the validated change order instances. The identified changes are then deployed in the system 100.

CONCLUSION

The above-described methods and systems describe unified service management. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A system for managing a network, comprising:
   one or more management servers to provide instructions for implementation by one or more managed nodes that are operatively coupled to the network and that are configured to run an application program, the one or more management servers comprising:
   a configuration management module to perform the following:
      receive a request that identifies changes to be implemented on the one or more managed nodes;
      select a model from a plurality of models associated with the changes, the plurality of models depicting various software applications and hardware components included in the network;
      provide a plurality of deployment profiles associated with the model, the deployment profiles including lists of criteria pertaining to implementation of the model, at least one of the lists of criteria including a number of applications that can be processed within a period of time;
      configure administration policies associated with a deployment profile selected from the plurality of deployment profiles;
      create change order instances from a chosen change template, the chosen change template based on the selected deployment profile, the change order instances including work flow definitions to be followed during implementation of the changes;
      validate the change order instances; and
      implement the changes based on the validated change order instances.

2. The system of claim 1, wherein the changes are based on statuses of the software applications and the hardware components on the network.

3. The system of claim 1, wherein the model is selected based on received responses to queries displayed in a user interface.

4. The system of claim 1, wherein the plurality of deployment profiles are suitable to an appropriate model.

5. The system of claim 1, wherein the administration policies are configured based on a consideration of service level agreement (SLA) constraints defined in the selected deployment profile.

6. The system of claim 1, wherein the change template is one of a group of predefined change templates for the selected deployment profile.

7. The system of claim 1, wherein the one or more managed nodes include one or more of the following: personal digital assistants, desktops, workstations, servers, and laptop computers.

8. The system of claim 1, wherein unifying agents are employed on the one or more managed nodes and employ instructions to automatically collect status of the one or more managed nodes and of other resources in the network.

9. The system of claim 8, wherein the unifying agents include an application monitor, a configuration module, and a notification reporter.

10. The system of claim 1, wherein the one or more management servers employ a unified console and are configured to employ one or more of: an operating mode, a changing mode, a supporting mode, and a planning mode.

11. The system of claim 10, wherein the unified console is configured to address operations, changes, and planning of the network.

12. The system of claim 1, further comprising a configuration management database configured to track the changes.

13. The system of claim 1, wherein the lists of criteria pertain to one or more of a size of an enterprise network that can be implemented, a type of servers that may be used, and a required security type.

14. The system of claim 1 wherein the administration policies include one or more of health policies, network policies, and protection and recovery policies.

15. A method comprising:
   receiving a request that identifies changes to be implemented on one or more managed nodes that are operatively coupled to a network;
   selecting a model from a plurality of models associated with the changes, the plurality of models depicting various software applications and hardware components included in the network;
   providing a plurality of deployment profiles associated with the model, the deployment profiles including lists of criteria pertaining to implementation of the model, at least one of the lists of criteria including a number of transactions that can be processed within a period of time;

configuring administration policies associated with a deployment profile selected from the plurality of deployment profiles;

creating change order instances from a chosen change template, the chosen change template based on the selected deployment profile;

validating the change order instances; and implementing the changes based on the validated change order instances.

16. The method of claim 15, wherein the lists of criteria further include criteria pertaining to a size of an enterprise network that can be utilized to implement the model.

17. The method of claim 15, wherein the lists of criteria further include a type of server that can be used to implement the model.

18. A computer-readable memory storing computer-executable instructions that, when executed by one or more processors, cause the one or more processors to perform operations comprising:

receiving a request that identifies changes to be implemented on one or more managed nodes that are operatively coupled to a network;

selecting a model from a plurality of models associated with the changes, the plurality of models depicting various software applications and hardware components included in the network;

providing a plurality of deployment profiles associated with the model, the deployment profiles including lists of criteria pertaining to implementation of the model, at least one of the lists of criteria including one or more types of security policies that can be used to implement the model;

configuring administration policies associated with a deployment profile selected from the plurality of deployment profiles;

creating change order instances from a chosen change template, the chosen change template based on the selected deployment profile;

validating the change order instances; and implementing the changes based on the validated change order instances.

19. The computer-readable memory of claim 18, wherein the lists of criteria further include a number of applications that can be processed within a period of time.

20. The computer-readable memory of claim 18, wherein the change order instances including work flow definitions to be followed during implementation of the changes.

* * * * *